United States Patent [19]
Garvin

[11] 4,355,369
[45] Oct. 19, 1982

[54] AUTOMATIC BANKING MACHINE

[75] Inventor: Billy R. Garvin, Euless, Tex.

[73] Assignee: Docutel Corporation, Irving, Tex.

[21] Appl. No.: 48,837

[22] Filed: Jun. 15, 1979

Related U.S. Application Data

[63] Continuation of Ser. No. 600,399, Jul. 30, 1975, abandoned.

[51] Int. Cl.³ .......................................... G06F 15/30
[52] U.S. Cl. .................................. 364/900; 235/379
[58] Field of Search ... 364/200 MS File, 900 MS File, 364/401, 406; 235/379, 380, 382; 340/825.33

[56] References Cited

U.S. PATENT DOCUMENTS

| | | | |
|---|---|---|---|
| 3,181,124 | 4/1965 | Hammel | 364/200 |
| 3,308,439 | 3/1967 | Tink et al. | 364/200 |
| 3,341,820 | 9/1967 | Grillmeier et al. | 364/200 |
| 3,351,912 | 11/1967 | Collom et al. | 364/900 |
| 3,573,749 | 4/1971 | Smith et al. | 364/900 |
| 3,594,734 | 7/1971 | Wang et al. | 364/200 |
| 3,631,403 | 12/1971 | Asbo et al. | 364/200 |
| 3,681,758 | 8/1972 | Oster et al. | 364/900 |
| 3,699,532 | 10/1972 | Schaffer et al. | 364/200 |
| 3,737,863 | 6/1973 | Rowland et al. | 364/200 |
| 3,748,452 | 7/1973 | Ruben | 364/200 |
| 3,798,605 | 3/1974 | Feistel | 364/200 |
| 3,803,557 | 4/1974 | Kievit et al. | 364/200 |
| 3,806,882 | 4/1974 | Clarke | 364/200 |
| 3,820,080 | 6/1974 | Abrams et al. | 364/200 |
| 3,937,925 | 2/1976 | Boothroyd | 364/900 |
| 3,979,058 | 9/1976 | Katz et al. | 364/900 |

Primary Examiner—Gareth D. Shaw
Assistant Examiner—Thomas M. Heckler
Attorney, Agent, or Firm—Richards, Harris & Medlock

[57] ABSTRACT

A high speed, computer controlled banding machine provides fully automated teller stations for completing banking functions in response to a coded credit card presented thereto. A complete banking system normally consists of four remote terminals (customer consoles), interconnected to an electronic module containing a central controller, local journal printer, status monitor panel and bulk storage. Each remote terminal includes a magnetic stripe card handler, currency dispenser, instruction display, function keyboard, numeric keyboard, control and communications electronics, receipt printer, power supply and supervisory key switch. Periodic system update and check-out, including the loading of bad account numbers into the system, is provided by operation of the supervisory key switch to place the system in a supervisory mode. Rotating the switch into a supervisory position on any one of the remote terminals places the entire system in a supervisory mode, and one of the remote terminals becomes a supervisory console providing means for entering system data through the numeric keyboard. When in the supervisory mode an operator selects one of several functions for setting the operational parameters of the system. The selected functions include setting the time of day, setting the calendar date, updating a bad account file and activating an accounting function.

9 Claims, 19 Drawing Figures

AUTOMATIC BANKING MACHINE

This is a continuation of application Ser. No. 600,399 filed July 30, 1975, now abandoned.

This invention relates to a banking machine, and more particularly to apparatus for setting the operational parameters of an automatic banking machine.

Recently, there has been a widespread acceptance of automatic banking machines by the banking community and the general public. This acceptance is partially based on the minimizing of the risk of unauthorized use of the machines through extensive checks on credit cards for activating such machines, and also upon the ability of the machine to make continuous self-checks of bad accounts. With the risk of unauthorized use now minimized, the banking industry and the general public have accepted automatic currency dispensers for unattended distribution of cash to complete some business and personal transactions. Further, the banking community and the general public are now accepting the use of automatic machines for transactions other than cash withdrawals. Machine banking is now provided for deposit transactions, transfer transactions between accounts and payment transactions between accounts or from a deposited payment. All these additional functions are provided with the same security as strictly cash transactions of earlier systems by means of extensive credit checks and user identification and time checks.

To further insure system integrity, banking machines are periodically checked and updated with a routine that includes the loading of bad account numbers into a bad account number memory. This system check-out and update is completed by placing the machine in a supervisory mode thereby locking out all the normal banking transactions. In addition to the loading of bad account numbers when in the supervisory mode, the master clock and calendar are updated. When the system is placed in the supervisory mode a complete accounting of the system operation is enabled in one of the selected modes. System accounting may also provide checks on the operation of the system for any unauthorized use or malfunction of the equipment.

In accordance with the present invention, apparatus for setting the operational parameters of an automatic banking machine includes a key switch for placing the machine into a supervisory mode from a normal banking mode. The various selectable functions of the supervisory mode are displayed for purposes of selection by an operator and the operator selects one of the supervisory mode functions by means of an array of push button switches, each identified with one of the supervisory mode functions.

More specifically, apparatus for setting the operational parameters of an automatic banking machine in accordance with the present invention includes a display for the various supervisory mode functions that consist of: (1) setting the time of day, (2) setting the calendar date, (3) updating the bad account memory, and (4) calling for a system accounting.

A more complete understanding of the invention and its advantages will be apparent from the specification and claims and from the accompanying drawings illustrative of the invention.

Referring to the drawings.

Figure 5A:
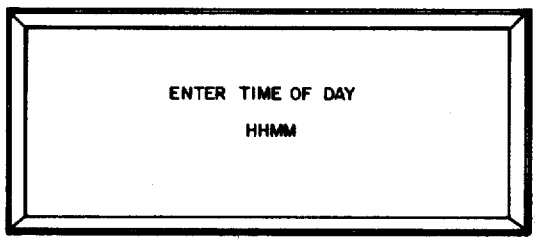
Figure 5B:
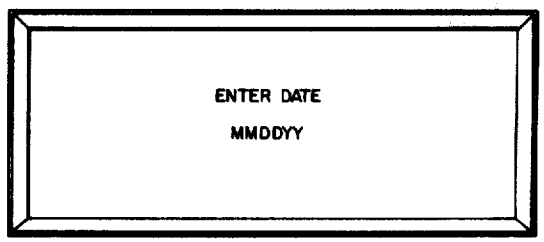
Figure 6A:
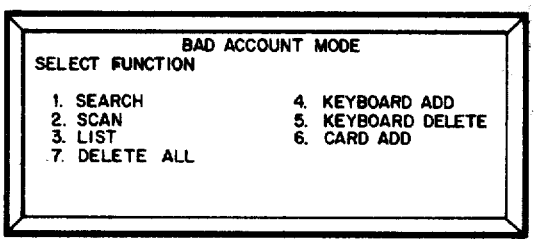
Figure 6B:
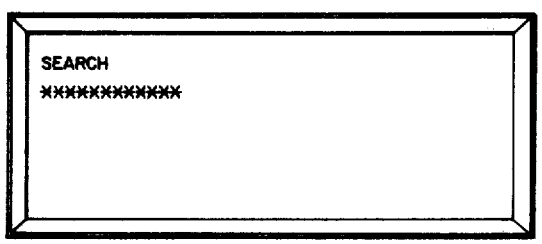
Figure 6C:
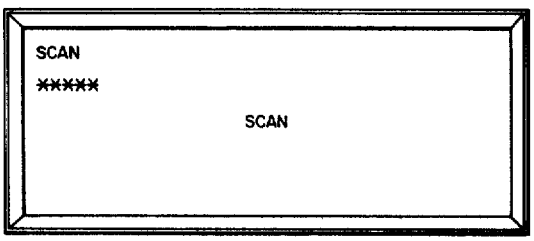
Figure 6D:
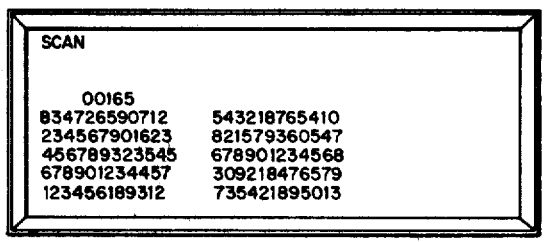
Figure 6E:
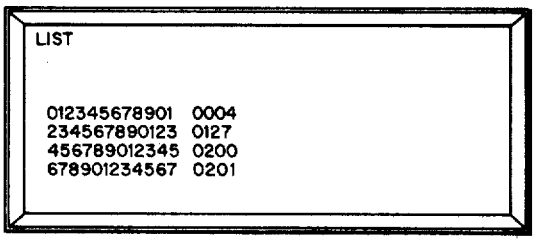
Figure 6F:
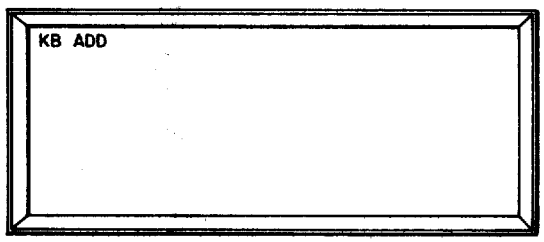
Figure 6G:
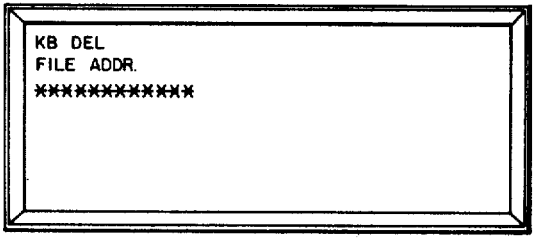
Figure 6H:
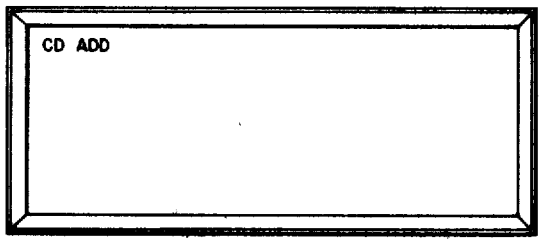
Figure 6I:
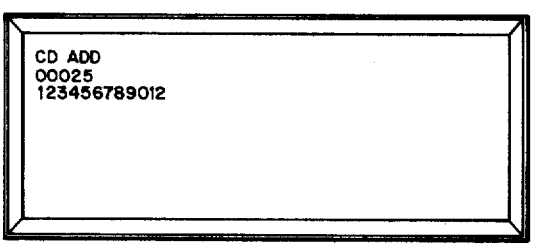
Figure 6J:
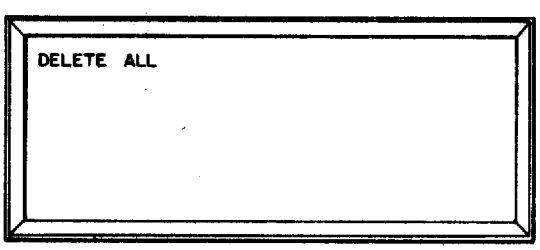
Figure 7A:
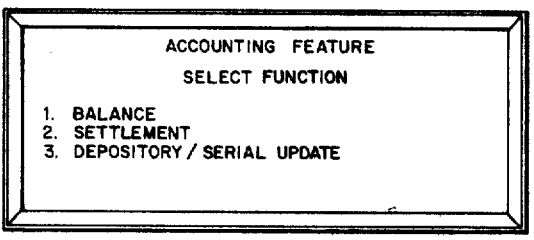
Figure 7B:
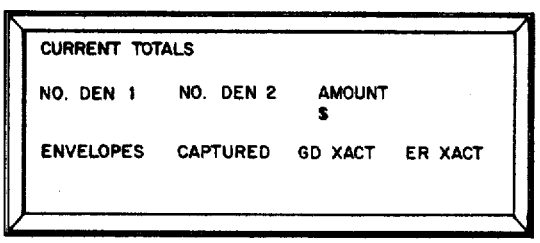

FIGS. 5A and 5B comprise a series of display messages at a remote terminal when in the supervisory mode for the time and date functions;

FIGS. 6A-6J illustrate the display messages with the banking system in the bad account function of the supervisory mode; and FIGS. 7A and 7B illustrate the display messages with the banking system in the accounting function of the supervisory mode.

Referring to the drawings, an island 10, located in an area convenient for customer usage, includes four remote terminals (customer consoles) 12, only two shown, to enable up to four customers to make deposits, make cash withdrawals, transfer funds between accounts and make prearranged payments to accounts. The four consoles of the island 10 are all connected by a cable 14 to a central controller 16 that forms a part of the total banking system. The central controller 16 also has the capability of providing an interface for telephone communications, a local journal printer, bulk storage and a status monitor. The status monitor allows an operator, not located in the area of the island 10, to review pertinent information on a display related to the operation and failures of the terminals 12.

Each terminal 12 independently reads and updates magnetic cards, leads a customer through a transaction by use of a display, provides appropriate push-button keys for data entry and provides a receipt at the end of the transaction. Further, in accordance with a feature of the present invention, each terminal provides the capability of inputing data and updating operating parameters of the system when it is placed in a supervisory mode.

On the front panel of each of the terminals 12, there is arranged an array of twelve push-button keys in an amount/security keyboard 18 for use by a customer to interface with a computer of the central controller 16. Ten of the push-button keys 18 are marked 0-9 to enable a user to insert his assigned identification code for verification of his authority to use a credit document presented to the machine through a card gate 20. In addition, as will be explained, these keys marked 0-9 are utilized by an operator with the system in the supervisory mode to input operating parameters and update the system operation. In addition, these ten keys, marked 0-9, enable a user to input into the system the value of the transaction to be completed.

Transaction amounts, entered by operation of the push-button keyboard 18 are presented on an instruction display 22 as is other instruction information for use by a customer during normal operation of a terminal 12. Further, the display 22 provides a means for instructing an operator of the various supervisory mode selected functions.

One of the remaining two keys of the group 18 is a "clear" push-button for correcting mistakes made by the user in inserting his assigned identification code or transaction amount. The remaining key is an "entry" push-button for commencing a processing transaction of the machine and to initialize the operation of a particular supervisory mode function.

In addition to the push-button keys on the amount-/security keyboard 18, the front panel of the terminal 12 includes a transaction keyboard 24 consisting of twelve push-buttons arranged in sets of three in four rows. The type of banking transaction performed by the machine depends upon the transaction key depressed in the keyboard 24. Each key in the four sets on the transaction keyboard 24 represents an independent banking transaction to be processed and completed by the system.

Additional user interface on the front panel of the terminal 12 includes a currency dispenser 26 comprising two parallel delivery paths for separate denominations of bills. To the left of the currency dispenser 26 is a receipt dispenser 28 for delivering to the user a printout of his completed transaction. Further, the receipt printer 28 operates in the supervisory mode to provide a hard copy of an accounting of the transactions and amounts completed by the system. To put the system in the supervisory mode, each of the terminals 12 includes a supervisory key switch 30 located in the lower right hand corner.

Also located in the island 10 for each of the remote terminals 12 is a depository 32 located immediately below the associated terminal. The depository functions to accept deposit and payment transactions in accordance with instructions to a user in the display 22.

Figure 2:
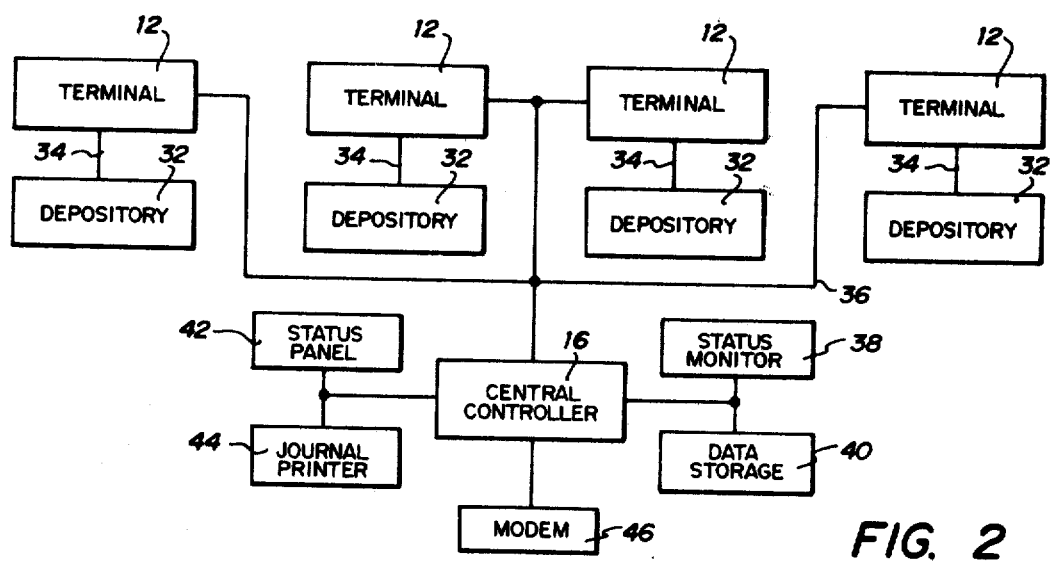
FIG. 2 is a block diagrm of a four terminal system, with each terminal including a depository and connected to a central controller having a status panel and status monitor.

Referring to FIG. 2, there is shown a block diagram of a typical system including four remote terminals 12. Each of the remote terminals 12 is electrically interconnected to the associated depository 32 by means of a communication line 34. The terminals are connected by means of communication lines 36 as part of the cable 14 to the central controller 16. Included within the module for the central controller 16 is a status monitor 38, data storage memory 40, a status panel 42 and a journal printer 44. Each of the subsystems 38, 40, 42 and 44 are interconnected to the central controller 16 and controlled thereby. For installations where data in the central controller 16 is to be transmitted over telephone lines, a modem 46 is connected to the central controller 16.

The central controller is the heart of the system of the present invention and encompasses a computer, such as a Computer Automation, Inc. Alpha-16 Unit. Also included as a part of the central controller 16 are associated processor modules, a terminal interface unit for each terminal, a data panel incorporating system status/fault monitoring features, a modem controller (where required), the storage unit 40 and the journal printer 44. The computer of the central controller typically includes a central processing unit (CPU), a 16K memory, a real time clock, a failure/restart circuit, operator's console, teletype interface, and power supply. Various components having interconnections in the central controller 16, including the Alpha-16 Computer, are commercially available units interconnected in accordance with accepted practices.

Figure 3:
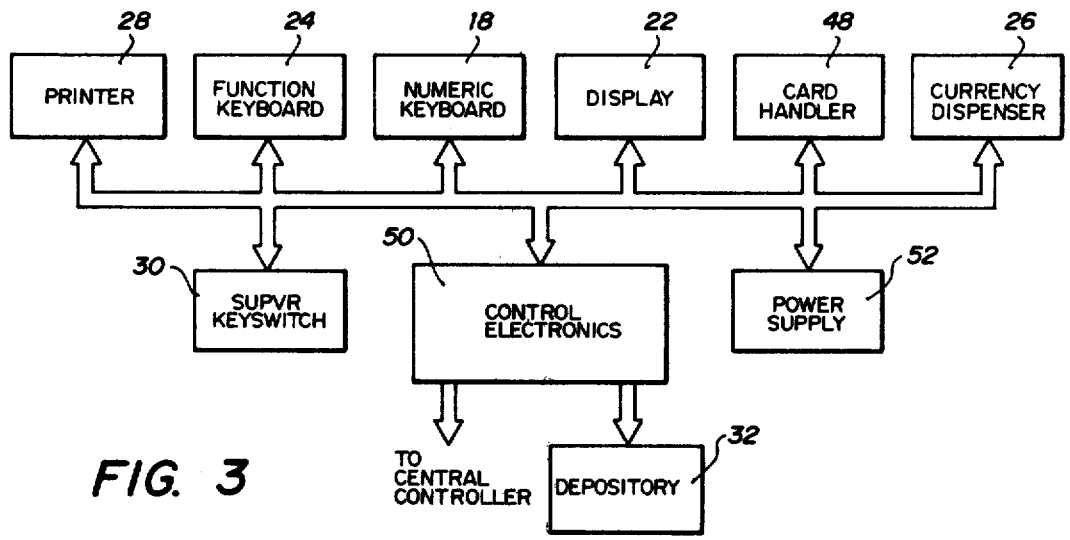
FIG. 3 is a block diagram of a remote terminal of the banking system of FIG. 2.

Referring to FIG. 3, there is shown a block diagram of the various subsystems of each terminal 12 including a card handler 48 that may typically be a multitrack unit designed to read and write on magnetic stripe cards. Control logic contained within the unit 48 is interconnected to the central controller 16 through terminal control electronics 50. The card handler 48 has provisions for returning a valid card to a customer or capturing an invalid or fradulent card.

The currency dispenser 26 is a two denomination bill dispenser capable of dispensing single bills without carriers, holders or attachments at a preset rate per side. Sensors in the dispenser are coupled through the electronics control 50 to the central controller 16 to detect each bill as it is dispensed and provide for diverting double (two or more) dispensed bills for later retrieval from the individual terminals 12.

Another subsystem of each terminal 12 is the display 22 comprising a digital readout capable of displaying alphanumeric data in parallel lines. Typically, the display produces characters in a dot matrix wherein the matrix consists of addressable light points arranged in a dot pattern. Display messages are programmable through the control electronics 50 from the central controller 16 as required to provide a wide variety of customer instructions. In addition to customer instructions, the display 22 provides a visual readout when data input or system update is performed using the numeric keyboard 18 in the supervisory mode.

The function keyboard 24, as previously described, consists of twelve momentary on push-buttons mounted on a printed wiring board containing keyboard logic circuitry and components. Connection of the keyboard 24 is by means of a standard connector through the control electronics 50 to the central controller 16. Similarly, the numeric keyboard 18 also consists of twelve momentary on push-buttons mounted on a printed wiring board containing keyboard logic circuitry and components. With the exception of the switch nomenclature, the keyboards 18 and 24 are essentially the same. The interconnection of a keyboard 18 is by way of standard interconnection through the control electronics 50 to the central controller 16. In addition to customer security codes and transaction amounts, the keyboard 18 is used in conjunction with the supervisory mode to input system data, bad account file data, and update the system clock and system calendar.

Transaction receipts are printed during each transaction cycle via the printer 28 thereby providing the customer with a transaction record. The printer 28 is directed from the central controller 16 through the control electronics 50. Typically, the printer includes continuously rotating print wheels with two lines of characters and an associated hammer for each character line. Upon receipt of a signal from the central controller 16, each hammer is activated by a solenoid and impacts a receipt form against the selected print character on the rotating wheel. This printer is also activated during the supervisory mode as will be explained.

A regulated DC power supply 52 is incorporated into each terminal 12 to supply the required voltages to the logic circuit of the control electronics 50, the card handler, the currency dispenser, printer and display.

Also designed to operate in conjunction with the terminal 12 is the depository 32 under control of the respective terminals. Typically, the depository 32 consists of a throat printer transport assembly, actuating relays, a power supply and a storage area for deposited documents. Each deposited document is automatically stamped with an identification number prior to its being transported to the storage area.

Figure 1:
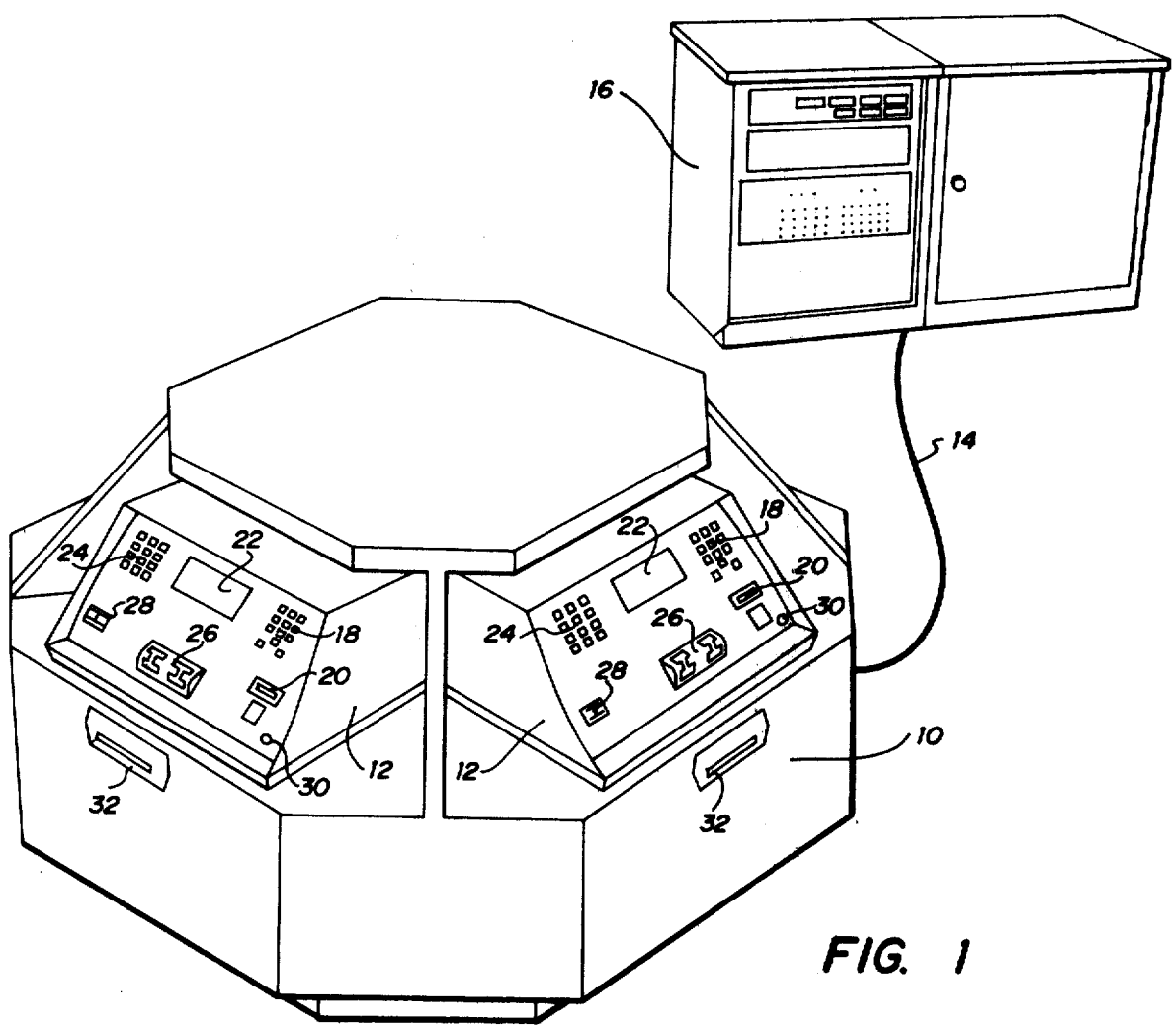
FIG. 1 is a pictorial of a remote terminal island interconnected to an electronic module.

To permit service personnel to place the banking system of FIG. 1 into a supervisory mode, each terminal 12 includes the supervisory key switch 30 interconnected to the central controller 16 through the control electronics 50. Turning the key switch 30 electronically removes all four of the terminals 12 from the system and enables updating the system clock and system calendar, allows entry of bad account data, enables the performance of a daily machine balance and periodic auditing, or maintenance of peripheral equipment.

When the key switch 30 is in the operation position, the system is dedicated to performing all normal transactions as set forth in the function keyboard 24. Rotating the supervisory key switch 30 into the supervisory position enables the particular terminal to become a supervisory console providing apparatus for entering system data through the numeric keyboard 18.

Figure 4A:
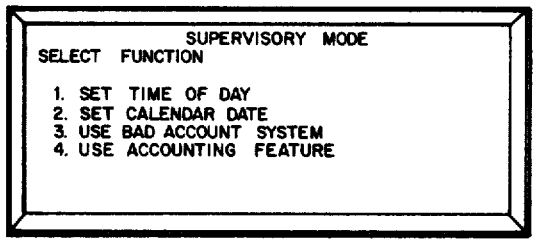
FIGS. 4A and 4B are illustrative of the displayy of one of the remote terminals when in the supervisory mode.

When the key switch 30 is rotated into the supervisory mode position, on any one of the terminals 12, if no transactions are in progress on any of the other three terminals 12, the message "PLEASE WAIT" is illuminated on the display 22 of the three terminals where the key switch 30 is in the normal operation position. For the terminal where the key switch 30 has been rotated into the supervisory mode position, the display 22 is energized from the central controller 16 to display the message as shown in FIG. 4A. This message indicates that the system is in the supervisory mode.

Should a normal banking transaction be in progress at any other terminal of the system, that transaction will continue until completed. However, no new transactions are permitted by the central controller 16 until the supervisory function has been terminated and the key switch 30 is returned to the normal operation position.

When the display 22 provides the message of FIG. 4A the system is in the supervisory mode and an operator selects the desired function by entering into the system the number shown to the left of the function description by means of the numbered push-button switches on the keyboard 18. Selections for operation of the system in the supervisory mode are limited to those illustrated in the display 22 and only the corresponding numbered key switch in the keyboard 18 responds to activate the central controller 16 into the selected function. Also operational during the supervisory mode are the "ENTER" and "CLEAR" push-buttons for entering the selected function into the system or for clearing an error. When in the supervisory mode, the function keyboard 24 is locked out and the central controller 16 does not respond to the operation of this keyboard from any of the terminals 12.

Figure 4B:
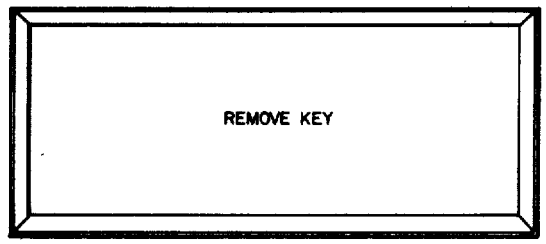

After all the supervisory or maintenance functions are completed, the system is returned to normal banking operation by repeatedly depressing the "ENTER" push-button as required until the message shown in FIG. 4B is illuminated in the display 22. With the message of FIG. 4B showing in the display 22, the central controller 16 locks out all operations of the system until the supervisory key switch 30 of the terminal 12 is rotated into the operation position. With the removal of the key from the switch 30, the system returns the four terminals 12 to normal banking operation.

In the supervisory mode, to set the time of day into the system or to correct the system clock, the operator depresses the "1" push-button on the numeric keyboard 18 and the message as shown in FIG. 5A is illuminated in the display 22. Four digits corresponding to the military time of day are then entered through the numeric keyboard 18. As each digit is entered by depressing one of the push-buttons on the numeric keyboard 18, it replaces the next character in the prompting message illustrated in the lower part of the display of FIG. 5A. For example, to enter the time 12:34, the operator depresses the "1" push-button and the first H of the prompting message is replaced with the number "1". Next, the operator depresses the "2" push-button and the second H is replaced with a number "2". This continues with the push-buttons "3" and "4" until all the letters of the prompting message are replaced with the numbers of the time to be entered. Entry errors made by the operator are corrected by depressing the "CLEAR" push-button of the keyboard 18 which clears all previous entries and returns the prompting message to that as shown in FIG. 5A.

After four digits have been entered through the numeric keyboard 18, the "ENTER" push-button is depressed and the time as illustrated in the display 22 is entered into the central controller 16 through the control electronics 50.

If less than four digits have been selected when the "ENTER" push-button is depressed, the central controller 16 will reject the time entered and the display 22 will return to the prompting message of FIG. 5A. This requires the re-entry of all four digits of the desired time.

Note, that the time is not entered into the central controller 16 until the "ENTER" push-button is depressed. Thus, the operator selects an upcoming time to ready the system for entry of the displayed time. In this manner, accurate time entry is assured by depressing the enter push-button at the displayed time. After a correct entry of time into the central controller 16, the "ENTER" push-button is again depressed and the display 22 returns to the message of FIG. 4A to display the original supervisory mode message.

To set the calender date, the operator depresses the "2" push-button on the numeric keyboard 18 and the message of FIG. 5B is illuminated in the display 22. This message indicates the selected function and also a six place prompting message appearing in the lower portion of the display. The prompting message includes two spaces for a selected month, two spaces for a selected date, and two spaces for a selected year. Thus, a six digit calendar date corresponding to the month, day and year, for example 02 16 74 (Feb. 16, 1974) is entered through the numeric keyboard 18.

To enter the six digits, the corresponding numbered push-button is depressed. As each digit is entered, it replaces the next character in the prompting message in a manner similar to that described with regard to the entry of the time of day. That is, the first push-button depressed causes the first "M" of the prompting message to be replaced by a digit, the second push-button depressed causes the second "M" to be replaced by a digit and continuing until all six places have been replaced by the numeric representation of a calendar date.

When the desired date has been selected, the "ENTER" push-button of the numeric keyboard 18 is depressed and the selected date is entered into the central controller 16 through the control electronics 50. If less than six digits have been selected when the operator depresses the "ENTER" push-button, the numbers appearing in the message will be disregarded and the central controller 16 will re-energize the display 22 to illuminate the prompting message as shown in FIG. 5B. This requires a complete re-entry of six numbers identifying a correct date.

Should the operator attempt to enter an invalid month or date, the numbers 01/01 will be displayed and a complete six digit calendar date will have to be re-entered. Any errors made during the entry of a calendar date by addressing the wrong push-button may be corrected by depressing the "CLEAR" push-button which clears all the numerical entries and returns the display 22 to the prompting message of FIG. 5B. After a valid calendar date has been entered and verification displayed, the operator depresses the "ENTER" push-button to advance the central controller 16 to exit the calendar portion of the supervisory mode and display the original supervisory message of FIG. 4A in the display 22.

With the system in the supervisory mode, a third selectable function is a "bad account mode". After acquisition of the supervisory mode by depressing the "3" push-button of the numeric keyboard 18, the display 22 presents the messages of FIG. 6A. This message lists the seven functions selectable with the system in the bad account mode. Performance of a specific bad account file function is accomplished by further selection from the list as displayed in FIG. 6A. Selections are made through the numeric keyboard 18 by depressing the numbered push-buttons identified to the left of the listed functions.

To initiate the "search" function which runs through a search of the bad account file, an operator depresses the "1" push-button on the numeric keyboard 18 and the search message as shown in FIG. 6B is presented on the display 22 of the terminal in the supervisory mode.

To search for a specific account number in the bad account file, a number from 1 to 12 digits long is entered through the numeric keyboard 18, followed by depressing the "ENTER" push-button. As each digit is entered, it appears in the display 22 replacing one of the asterisks of FIG. 6B with the selected digit. If the account number as entered is stored in the system, the display 22 will illuminate a five digit file address of the data storage 40 on the third line of the message of FIG. 6B and await a further operator input. The display of the five digit file address indicates that the entered account number is listed in the bad account file. If the entered account number is not located within the storage 40, the message EOF will be presented in the display 22 juxtapositioned "SEARCH" as shown in FIG. 6B. The system will again await a further operator input.

The preceding described procedure may be again repeated to search if another account number is stored in the bad account file of the data storage memory 40. To terminate the "search" mode, an operator depresses the "ENTER" push-button of the keyboard 18 and the display 22 returns to the bad account mode prompting message of FIG. 6A.

The second listed function for the bad account mode is to scan a bad account file of the data storage 40. To enter the scan mode, an operator depresses the "2" push-button on the numeric keyboard 18 and the prompting message as shown in FIG. 6C is illuminated in the display 22. An operator then enters a 1 to 5 digit file address followed by depressing the "ENTER" push-button of the keyboard 18. As the operator depresses each of the numbered push-buttons of the keyboard 18 to enter a file address, the selected numbers are illuminated on the display 22 replacing the asterisks as shown in FIG. 6C.

When an address is entered into the system, the central controller 16 actuates the display 22 to illuminate the account number located at the entered file address, in addition, the next nine account numbers will also be shown such that the display appears as shown in FIG. 6D. The display 22 remains illustrated as shown in FIG. 6D until the operator depresses the CLEAR push-button of the keyboard 18. The ten account numbers presented in the display are then replaced by the next ten account numbers stored in the data storage 40 with null areas of the data storage skipped to always display ten numbers. The display 22 continues to hold these numbers until incremented by depressing the CLEAR push-button of the keyboard 18 and another group of ten account numbers will be displayed. Thus, groups of ten account numbers will be displayed when the system is incremented by depressing the CLEAR push-button until the complete file in the data storage 40 has been scanned, at which time the message EOF will be illuminated in the display 22 below the message SCAN. To terminate the scan mode at any time, an operator depresses the ENTER push-button causing the system to return to the bad account mode prompting message of FIG. 6A.

When the "LIST" function has been selected by an operator, with the system in the bad account mode, a bad account file printout is provided using the printer 28. To enter the "LIST" bad account mode, an operator depresses the "3" push-button on the numeric keyboard 18. Account numbers beginning with the first number stored in the data storage 40 are printed on a receipt form by the receipt printer 28. Simultaneously with the printing of the bad account numbers, the printed information is monitored by the central controller 16 and illuminated in the display 22 as shown in FIG. 6E. The five digit number appearing immediately beside the bad account number indicates the address location of the first account number in the data storage 40.

The printer 18 continues to make a hard copy of the bad account numbers in the data storage 40 until the operator depresses the "0" push-button of the keyboard 18 to temporarily halt the printing routine. To resume the printing routine, an operator depresses the CLEAR push-button of the keyboard 18. To terminate the listing of bad account numbers an operator depresses the ENTER push-button causing the central controller 16 to return the display 22 to the bad account prompting message as shown in FIG. 6A.

The fourth function listed for selection when the system is in the bad account mode is the keyboard add function. The keyboard add function is entered by depressing the "4" push-button on the numeric keyboard 18 thereby enabling the display 22 to illuminate the message of FIG. 6F. When in this mode, additional account numbers may be added to the bad account file of the data storage 40 by use of the numeric keyboard 18.

The operator responds to the prompting message of FIG. 6F by entering an account number of from 1 to 12 digits followed by depressing the ENTER push-button. Each time the operator actuates one of the numbered push-buttons of the keyboard 18 it appears in the display 22 replacing one of the asterisks shown in FIG. 6F.

If an address location is open in the data storage 40, the central controller 16 actuates the display 22 to display the file address in addition to adding the entered account number into the data storage at the displayed address.

To continue in the keyboard add mode for additional entries of account numbers, an operator presses the CLEAR push-button after each preceding account number has been entered into the system. The prompting message of FIG. 6F again appears in the display 22 and the operator responds thereto by entering another account number followed by depressing the ENTER push-button.

To correct entry errors of account numbers an operator depresses the CLEAR push-button prior to depressing the ENTER push-button. This returns the prompting message to the display of FIG. 6F and the operator re-enters the correct account number. Should the data storage 40 not have available storage space, the central controller 16 actuates the display 22 to illuminate the message EOF on line 1 juxtapositioned the message "KB ADD". To terminate the keyboard add mode, an operator depresses the ENTER push-button a second time after entry of an account number. This returns the system to the bad account mode and the prompting message of FIG. 6A is illuminated on the display 22.

To enter the fifth listed function of the bad account mode, that is, the keyboard delete function, an operator depresses the "5" push-button on the numeric keyboard 18 and the prompting message of keyboard delete is illuminated on the display 22 as shown in FIG. 6G. This mode enables an operator to delete account numbers from the bad account memory of the data storage memory 40 using the numeric keyboard 18. The operator responds to the prompting message of FIG. 6G by entering a 1 to 12 digit account number through the numeric keyboard 18 followed by depressing the ENTER push-button. Each time the operator depresses one of the push-buttons of the numeric keyboard 18 that number appears in the display 22 replacing one of the asterisks of the prompting message of FIG. 6G. Depressing the ENTER push-button actuates the central controller 16 to delete the entered account number from the data storage memory 40. At this time, the display 22 is also actuated to illuminate above the illuminated account number previously entered into the system the file address of the deleted account number.

Any errors made by the operator during entry of an account number may be corrected by depressing the CLEAR push-button prior to pressing the ENTER push-button and re-entering the correct account number. If the entered account number is not in the data storage memory 40, the central controller 16 actuates the display 22 to illuminate the message EOF adjacent the prompting message "KB DEL".

Each time the operator depresses the CLEAR push-button the central controller 16 returns the prompting message to that as shown in FIG. 6G and the system awaits further entries. Depressing the ENTER push-button a second time after entry of an account number terminates the keyboard delete function and returns the system to the bad account mode and the prompting message of FIG. 6A is again illuminated in the display 22.

Typically, a banking machine in accordance with the present invention is activated by a standard "A" size plastic credit card having a stripe of magnetic material located on the back side thereof. This magnetic stripe includes customer identification data including a customer account number, all in coded form. When the system is in the bad account mode and an operator depresses the "6" push-button of the numeric keyboard 18 the card add function is selected. This function provides for adding the account number coded on the magnetic stripe of a credit card to the bad account file, an operation similar to the function "4" of the display of FIG. 6A. Actuating the system into the card add function signals the central controller 16 to activate the display 22 to illuminate the prompting message of FIG. 6H. In addition to adding account numbers to the data storage memory 40, this function may also be used to initially build a bad account file in the storage memory.

In response to the prompting message of FIG. 6H, an operator responds by inserting a magnetically encoded credit card into the card gate 20. The account number is read by a card reader and this information is transferred to the display 22 as shown in FIG. 6I two lines below the prompting message of FIG. 6H. The central controller 16 causes the account number to be stored in the data storage memory 40 at the first available address location. This address location is illuminated on the display 22 on the line intermediate the prompting message and the account number as shown in FIG. 6I. The illuminated number indicates that the account number displayed will be placed in address 25 of the data storage memory 40. When the data storage memory 40 is full and cannot accept additional account numbers, the message EOF is illuminated by the display 22 along with the prompting message and this display remains until either the CLEAR or ENTER push-buttons are depressed. Depressing the CLEAR push-button returns the display 22 to the prompting message of FIG. 6H and the system awaits insertion of another card. If the ENTER push-button is depressed, the card add function is terminated and the system returns to the bad account mode and the prompting message of FIG. 6A is illuminated in the display 22.

The seventh and last function available in the bad account mode enables an operator to delete all account numbers stored in the bad account memory of the data storage 40. To enter the delete all function, an operator depresses the "7" push-button on the numeric keyboard 18 and the prompting message of FIG. 6J is illuminated in the display 22. With the "DELETE ALL" message displayed, an operator presses the CLEAR push-button and the bad account file is erased. This function is terminated by depressing the ENTER push-button and the system reverts to the bad account mode and the prompting message of FIG. 6A is illuminated in the display 22. To return the system to the supervisory mode from the bad account mode, the operator again depresses the ENTER push-button and the message of FIG. 4A is illuminated in the display 22.

The fourth operation available in the supervisory mode is an accounting that completes a machine balance function, periodic auditing requirements, and depository serial number update. Accumulated totals of bills dispensed, denomination of bills dispensed, dollar value of currency dispensed, number of envelopes inserted into the depository 32, number of credit cards captured, number of completed transactions, and number of incompleted transactions are all available when an operator selects the account mode. This mode is entered by depressing the "4" push-button of the numeric keyboard 18 when the prompting message of FIG. 4A is illuminated in the display 22.

When an operator selects the accounting mode, the prompting message of FIG. 7A is illuminated in the display 22. In addition to providing balance and settlement accounting features, the accounting mode also enables a depository serial number update to permit synchronizing depository and terminal transaction serial numbers. Access to any of the three listed functions is gained by depressing the numbered push-buttons on the keyboard 18 related to the desired function.

When the balance mode has been selected by depressing the "1" push-button on the numeric keyboard 18, the balance message of FIG. 8B is illuminated on the display 22. Each total of the various items listed from the date storage memory 40 since the last settlement is displayed. Depressing the ENTER push-button returns the accounting feature message of FIG. 7A to the display 22.

To enter the settlement function of the accounting mode, an operator depresses the "2" push-button of the numeric keyboard 18 and the message of FIG. 7B is again illuminated in the display 22. The settlement function displays the same information as the balance function with the added feature of a printed record provided by the receipt printer 28. In this function, the printer 28 is activated only after the operator presses the "CLEAR" push-button of the keyboard 18.

After printing the various totals, the system awaits a further input from the operator. If the ENTER push-button is depressed, the system reverts to the accounting mode and the message of FIG. 7A is again illuminated in the display 22.

To enter the depository serial number update function, an operator depresses the "3" push-button on the numeric keyboard 18 and the display 22 is activated to illuminate various message during the completion of this function. Two conditions may exist that require serial number update, the remote terminal 12 has a serial number that is advanced further than the serial number of the depository 32, and the depository serial number may advance further than the serial number of the terminal 12.

Assume, for purposes of illustration, that the serial number of one of the terminals 12 equals 010123 and the serial number of the associated depository 32 equals 010120. The depository serial number is entered using the numeric keyboard 18 and this number is illuminated in the display 22. Next, the operator depresses the ENTER push-button and both the terminal serial number and the depository serial number are displayed. The operator then enters the desired serial number (010123) for the depository 32 and depresses the ENTER push-button. This number is also illuminated on the display 22 such that the terminal serial number, the depository serial number, and the desired depository serial number are all simultaneously displayed.

Depressing the ENTER push-button activates the central controller 16 to update the serial number of the depository 32. After the depository counter has incremented to the desired number, the system automatically returns to the supervisory mode message of FIG. 4A when the terminal serial number and the depository serial number are equal. To increase the serial number of a terminal 12 when the serial number of a depository 32 is advanced further than the terminal serial number, the same procedure is followed as described in the preceding example.

After all supervisory mode functions have been completed, an operator rotates the supervisory key switch 30 to the normal banking position and all four remote terminals 12 are available for normal banking transactions. Of course, during any one supervisory mode operation, not all the functions of FIG. 4A may be completed. An operator selects one or more of the functions to check selected operations of the system.

In one embodiment of the invention, the central controller 16 comprised an Alpha-16 Computer, as mentioned previously, including a central processing unit and other commercially available peripheral equipment. When the system is placed in the supervisory mode by operation of the supervisory key switch 30, the central controller 16 operates in accordance with stored instructions for each of the four routines listed in FIG. 4A. Instructions for operation of the central controller 16, when in the supervisory mode, are given in Table I which comprises a listing by number of the instruction steps performed by the controller 16.

When an operator selects the bad account function of the supervisory mode, the central controller 16 operates in accordance with a preestablished subroutine of processing steps. These processing steps are set forth in Table I and Table II. The operation of the central controller 16, in accordance with the listing of Table II, commences when called at the proper processing step of the routine as set forth by the listing of Table I. That is, as the central controller operates in accordance with the preestablished order of steps of Table I, it advances to a step for calling the subroutine of Table II. The central controller 16 then operates in the preordered sequence of steps listed in Table II to complete the bad account function of the supervisory mode.

Upon selection of the account feature by an operator through the keyboard 18, the central controller 16 processes the supervisory mode operation to the step for calling the accounting feature at which time the controller begins to operate in accordance with the subroutine as given by the listing of Table III. The central controller 16 then operates in accordance with the preordered sequence of numbered instructions as set forth in Table III. This operation continues until the last processing step is completed, at which time operation of the central controller 16 reverts to the routine of Table I. The operation of the system in the supervisory mode, when operating in accordance with the instructions of Table III, is as described with reference to FIGS. 7A and 7B.

TABLE I

```
PAGE    0001
0001            *   T4 SYSTEM
0002            *   ROUTINE TO CONTROL SUPERVISORY MODE
0003            *
0004            *
0005            *
0006                    NAM
0007                    NAM
0008                    NAM
0009                    NAM
0010                    NAM
0011                    NAM
0012                    NAM
0013                    NAM
0014                    EXTP
```

```
0015                        EXTR
0016                        EXTR
0017                        EXTR
0018                        EXTR
0019                        EXTR
0020                        EXTR
0021                        EXTR
0022                        EXTR
0023                        EXTR
0024                        EXTR
0025   0000                 REL
0026                   *
0027                   *
0028         0020   CPB      EQU   45
0029         002F   K        EQU   47
0030         003C   M        EQU   48
0031         0035   NLO      EQU   53
0032         0037   OBUF     EQU   55
0033                   *
0034                   *
0035   0000  B2AF   SUPER  LDA   SMMODE
0036   0001  2101          JAZ   $+2         SUPER OR MAIN BUSY?
0037   0002  F900          JST   QUIT        YES
0038   0003  C601          LAP   1           NO
0039   0004  9AA8          STA   SMMODE      MARK BUSY
0040                   *
0041                   *
0042   0005  F8BE          JST   *PSETTP     DISABLE ALL TERMINALS
0043   0006  F900          JST   PAUSE       GO TO END OF RUN QUEUE
0044                   *
0045                   *
0046   0007  C400   SUPERC LXP   0
0047   0008  F900          JST   P
0048   0009  C600          LAP   0
0049   000A  F900          JST   DPLY:       SYSTEM IS IN SUPERVISORY MODE
0050   000B  F2E8          JMP   ERR1
0051   000C                DATA  MES1
0052   000D  C621          LAP   #21
0053   000E  F900          JST   DPLY:       SELECT FUNCTION
0054   000F  F2E2          JMP   ERR1
0055   0010                DATA  MES2
0056   0011  C623          LAP   #23
0057   0012  F9C0          JST   DPLY:       1. SET TIME OF DAY
0058   0013  F2DE          JMP   ERR1
0059   0014                DATA  MES3
0060   0015  C624          LAP   #24
0061   0016  F90C          JST   DPLY:       2. SET CALENDAR DATE
0062   0017  F2DA          JMP   ERR1
0063   0018                DATA  MES4
0064   0019  C625          LAP   #25
0065   001A  F900          JST   DPLY:       3. USE BAD ACCOUNT SYSTEM
0066   001B  F2D6          JMP   ERR1
0067   001C                DATA  MES5
0068   001D  C626          LAP   #26
0069   001E  F900          JST   DPLY:       4. USE ACCOUNTING FEATURE
0070   001F  F2D2          JMP   ERR1
0071   0020                DATA  MES6
0072   0021  C400          LXP   C
0073   0022  F900          JST   V
0074                   *
0075                   *
0076   0023  C601          LAP   1
0077   0024  F900          JST   KBIN:       GET COMMAND FROM R.H. KEYBOARD
0078   0025  8000          AND   =#F
              000F
0079   0026  9ACC          STA   TEMP
0080   0027  C00A          CAI   #A          GO OUT OF SUPERVISORY MODE?
0081   0028  F26D          JMP   END         YES
0082   0029  C00C          CAI   #C          NO, CLEAR KEY?
0083   002A  F623          JMP   SUPERC      YES
0084   002B  C001   WHAT1  CAI   1           SET TIME OF DAY?
0085   002C  F233          JMP   ONE         YES
0086   002D  C002          CAI   2           SET CALENDAR DATE?
0087   002E  F205          JMP   TWO         YES
0088   002F  C003          CAI   3           USE BAD ACCOUNT SYSTEM?
0089   0030  F294          JMP   THREE       YES
0090   0031  C004          CAI   4           USE ACCOUNTING FEATURE?
0091   0032  F3C1          JMP   *PFCUR      YES
0092   0033  F62C          JMP   SUPERC      INVALID SELECTION
```

```
0093        .
0094        .
0095  0034  C602  TWO   LAP   2
0096  0035  F900        JST   DPLY1   ENTER CALENDAR DATE
0097  0036  F288        JMP   ERR1
0098  0037              DATA  MES9
0099  0038  C624  TCLR  LAP   $24
0100  0039  F900        JST   DPLY1   MMDDYY
0101  003A  F287        JMP   ERR1
0102  003B              DATA  MES10
0103  003C  82E4        LDA   PWORD1  BUILD ADDRESS POINTERS
0104  003D  135I        LLA   2       FOR WORD 1 AND ONES
0105  003E  9AE3        STA   ADRS1
0106  003F  82B5        LDA   PDATEN
0107  0040  135C        LLA   1
0108  0041  9AE1        STA   ADRS2
0109  0042  F8E6        JST   =PBLKMS BLANK BACKES
0110  0043  F286        LDX   P1BANS
0111  0044  A2B1        LDA   COUNT
0112  0045  FBB1        JST   =MOVIT  MOVE MMDDYY TO ONES
0113  0046              DATA  MES10
0114  0047  C706        LAM   6
0115  0048  9ADE        STA   CNT     SET UP COUNT FOR CALENDAR DATE
0116  0049  C601  TDATA LAP   1
0117  004A  F90C        JST   KBIN1   GET DIGIT OF MMDDYY FROM R.H. KEYBOARD
0118  004B  80C0        AND   =$F
            00CF
0119  004C  C00A        CAI   $A      ENTER?
0120  004D  F2C6        JMP   TENTER  YES
0121  004E  000C        CMS   =$C     NO, CLEAR?
            000C
0122  004F  F202        JMP   $+3     NO, GOOD DIGIT
0123  0050  F6C7        JMP   TDATA   NO, BAD DIGIT
0124  0051  F619        JMP   TCLR    YES
0125  0052  FA5F        JST   DIGIT   PUT DIGIT IN ONES, WORD1, AND DISPLY
0126  0053  F6CA        JMP   TDATA   GET NEXT DIGIT
0127  0054  A202  TENTER LDA  CNT
0128  0055  7101        JAZ   $+2     SIX DIGITS ENTERED?
0129  0056  F64F        JMP   SUPERC  NO
0130  0057  82CC        LDA   WORD1
0131  0058  C401        LXP   1
0132  0059  F89E        JST   =STIME  UPDATE MONTH/DAY
0133  005A  82CA        LDA   WORD1+1
0134  005B  1307        LRA   8
0135  005C  C402        LXP   2
0136  005D  F89A        JST   =STIME  UPDATE YEAR
0137  005E  F89A        JST   =TIPEN  BUILD NEW TIME LINE
0138  005F  F228        JMP   DTIME
0139        .
0140        .
0141  0060  C602  ONE   LAP   2
0142  0061  F9C0        JST   DPLY1   ENTER TIME OF DAY
0143  0062  F28F        JMP   ERR1
0144  0063              DATA  MES7
0145  0064  C624  OCLR  LAP   $24
0146  0065  F900        JST   DPLY1   MMMM
0147  0066  F28F        JMP   ERR1
0148  0067              DATA  MES8
0149  0068  8282        LDA   PWORD1  BUILD ADDRESS POINNTERS
0150  0069  1351        LLA   2       FOR WORD1 AND ONES
0151  006A  9AB7        STA   ADPS1
0152  006B  8289        LDA   PDATEN
0153  006C  135C        LLA   1
0154  006D  9AB5        STA   ADPS2
0155  006E  0AB4        TMS   ADPS2
0156  006F  F8B9        JST   =PPLKMS BLANK BACKES
0157  0070  F285        LDX   P1BANS
0158  0071  A2B4        LDA   COUNT
0159  0072  FB84        JST   =MCVIT  MOVE MMMM TO ONES
0160  0073              DATA  MES8
0161  0074  C7C4        LAM   4
0162  0075  9AE1        STA   CNT     SET UP COUNT FOR TIME OF DAY
0163  0076  C601  ODATA LAP   1
0164  0077  F900        JST   KBIN1   GET DIGIT OF MMMM FROM R.H. KEYBOARD
0165  0078  80C0        AND   =$F
            00CF
0166  0079  C00A        CAI   $A      ENTER
0167  007A  F2C6        JMP   OENTER  YES
0168  007B  0C0C        CMS   =$C     NO, CLEAR
```

```
0169  007C  F202           JMP    *+3        NO,GOOD DIGIT
0170  007D  F607           JMP    ODATA      NO,BAD DIGIT
0171  007E  F61A           JMP    OCLR       YES
0172  007F  FA32           JST    DIGIT      PUT DIGIT IN ONES,WORD1,AND DISPLY
0173  0080  F60A           JMP    ODATA      GET NEXT DIGIT
0174  0081  82A5   OENTER  LDA    CNT
0175  0082  2101           JAZ    *+2        FOUR DIGITS ENTERED?
0176  0083  F67C           JMP    SUPERC     NO
0177  0084  929F           LDA    WORD1
0178  0085  C400           LXP    0
0179  0086  F871           JST    *STIME     UPDATE HOUR/MINUTE
0180  0087  F871           JST    *TIMEM     BUILD NEW TIME LINE
0181  0088  C627   OTIME   LAP    #27
0182  0089  F90C           JST    OPLY*      TIME LINE
0183  008A  F267           JMP    ERR1
0184  008B                 DATA   MES
0185  008C  F6C1   TAG     LAP    1
0186  008D  F90C           JST    KBIN*      GET NEXT COMMAND FROM P.M. KEYBOARD
0187  008E  900C           AND    =*F
            000F
0188  008F  C0CA           CAI    *A         GO TO SUPERC
0189  0090  F6E9           JMP    SUPERC     YES
0190  0091  C0CC           CAI    *C         RETRY
0191  0092  F201           JMP    *+2        YES
0192  0093  F6C7           JMP    TAG        NO, INVALID COMMAND
0193  0094  825E           LDA    TEMP
0194  0095  F6A1           JMP    WHAT1
0195                *
0196                *
0197  0096  831A   END     LDA    *SMMCD
0198  0097  2109           JAZ    SCH        KEY REMOVED?
0199  0098  C603           LAP    3          NO
0200  0099  F90C           JST    OPLY*      REMOVE KEY
0201  009A  F257           JMP    ERP1
0202  009B                 DATA   MES24
0203  009C  C40F   END1    LXP    15
0204  009D  F9C0           JST    DELAY      WAIT FOR KEY TO BE REMOVED
0205  009E  0032           DATA   50
0206  009F  9311           LDA    *SMMCD
0207  00A0  3144           JAN    END1       KEY REMOVED
0208                *
0209                *
0210  00A1  C400   SCH     LXP    0          YES
0211  00A2  F900           JST    STRT       SCHEDULE TERMINAL 1
0212  00A3                 DATA   BGN
0213  00A4  C401           LXP    1
0214  00A5  F90C           JST    STRT       SCHEDULE TERMINAL 2
0215  00A6                 DATA   BGN
0216  00A7  C402           LXP    2
0217  00A8  F9C0           JST    STRT       SCHEDULE TERMINAL 3
0218  00A9                 DATA   BGN
0219  00AA  C4C3           LXP    3
0220  00AB  F9C0           JST    STRT       SCHEDULE TERMINAL 4
0221  00AC                 DATA   BGN
0222  00AD  C6C0           LAP    0
0223  00AE  9A01           STA    SMMCDE     MARK SUPER NOT BUSY
0224  00AF  F900           JST    QUIT
0225                *
0226                *
0227  00B0  00C0   SMMODE  DATA   0
0228  00B1         SMMOD   REF
0229                *
0230                *
0231  00B2  08C0   DIGIT   FMT
0232  00B3  9A72           STA    WORD3
0233  00B4  8272           LDA    CNT
0234  00B5  C000           CAI    0          EXPECTING ANOTHER DIGIT?
0235  00B6  F704           RTN    DIGIT      NO
0236  00B7  015C           IAR               YES
0237  00B8  9A6E           STA    CNT
0238  00B9  326C           LDA    WORD3
0239  00BA  F90C           JST    STMCD4     STORE BCD DIGIT IN WORD1
0240  00BB  0122           DATA   ADRS1
0241  00BC  9800           ADD    =*P0
            00B0
0242  00BD  F9CC           JST    STMCD2     STORE ASCII DIGIT IN ONES
0243  00BE  0123           DATA   ADRS2
0244  00BF  C624           LAP    #24
```

```
0245  00C0  F900         JST   OPLY:    DISPLAY BACHES
0246  00C1  F230         JMP   ERR1
0247  00C2  033F         DATA  BACHES
0248  00C3  F711         RTN   DIGIT
0249  00C4  C2FE  PSETTP DATA  SETTPN
0250               *
0251               *
0252  00C5  C6C0  THREE  LAP   0
0253  00C6  F9C0         JST   OPLY:    BAD ACCOUNT MODE
0254  00C7  F22A         JMP   ERR1
0255  00C8               DATA  MES11
0256  00C9  C621         LAP   #21
0257  00CA  F9C0         JST   OPLY:    SELECT FUNCTION
0258  00CB  F226         JMP   ERR1
0259  00CC               DATA  MES2
0260  00CD  C623         LAP   #23
0261  00CE  F9CC         JST   OPLY:    1. SEARCH    4. KEYBOARD ADD
0262  00CF  F222         JMP   ERR1
0263  00D0               DATA  MES13
0264  00D1  C624         LAP   #24
0265  00D2  F9C0         JST   OPLY:    2. SCAN      5. KEYBOARD DELETE
0266  00D3  F21F         JMP   ERR1
0267  00D4               DATA  MES14
0268  00D5  C625         LAP   #25
0269  00D6  F9C0         JST   OPLY:    3. LIST      6. CARD ADD
0270  00D7  F21A         JMP   ERR1
0271  00D8               DATA  MES15
0272  00D9  C626         LAP   #26
0273  00DA  F9C0         JST   OPLY:    7. DELETE ALL
0274  00DB  F216         JMP   ERR1
0275  00DC               DATA  MES90
0276  00DD  C6C1         LAP   1
0277  00DE  F900         JST   KBIN:    TYPE OF FUNCTION FROM R.H. KEYBOARD
0278  00DF  80C0         AND   =$F
      00DF
0279  00E0  9A12         STA   TEMP
0280  00E1  C0CA         CAI   :A       EXIT BAD ACCOUNT MODE
0281  00E2  F6D8         JMP   SUPERC   YES
0282  00E3  C0C1  WHAT   CAI   1        SEARCH FUNCTION?
0283  00E4  F2D7         JMP   SRCH     YES
0284  00E5  C0C2         CAI   2        SCAN FUNCTION?
0285  00E6  F314         JMP   MPSCAN   YES
0286  00E7  C0C3         CAI   3        LIST FUNCTION?
0287  00E8  F288         JMP   LIST     YES
0288  00E9  C0C4         CAI   4        KEYBOARD ADD FUNCTION?
0289  00EA  F27A         JMP   KBADC    YES
0290  00EB  C0C5         CAI   5        KEYBOARD DELETE FUNCTION?
0291  00EC  F28C         JMP   KBDFL    YES
0292  00ED  C0C6         CAI   6        CARD ADD FUNCTION?
0293  00EE  F295         JMP   CRDACC   YES
0294  00EF  C0C7         CAI   7        DELETE ALL?
0295  00F0  F3CB         JMP   MPDELAL  YES
0296  00F1  F62C         JMP   THREE    INVALID SELECTION - TRY AGAIN
0297  00F2  08CC  ERR1   MLT
0298  00F3  000C  TEMP   DATA  0
0299  00F4  02F6  PFOUR  DATA  FOUR
0300  00F5  0346  PDATEM DATA  BACHES+7
0301  00F6  00CA  COUNT  DATA  10
0302  00F7        MOVIT  REF
0303  00F8        STIME  REF
0304  00F9        TIMEM  REF
0305  00FA  033F  PIBAMS DATA  BACHES
0306  00FB  C2C3  PSCAN  DATA  SCAN
0307  00FC  0328  PDELAL DATA  DELALL
0308               *
0309               *
0310  00FD  0800  SRCH1  FMT
0311  00FE  91C0         LDA   PVA01    LOAD IMAM BUFFER ADDRESS
      025E
0312  00FF  F900         JST   STRTS    GET 12 DIGIT ACCOUNT NO. FROM KEYBOARD
0313  0100  00C9         DATA  9        AND DISPLAY IT
0314  0101               DATA  INUM
0315  0102  F900         JST   GETLOC
0316  0103  B435         LDA   ANLO
0317  0104  31C1         JAN   $+2      ZERO ACCOUNT NUMBER?
0318  0105  F64D         JMP   THREE    YES
```

```
0319   0106   0030            TKA
0320   0107   AA20            ADD    C55
0321   0108   1350            LLA    1
0322   0109   8C2F            ADD    2K
0323   010A   9430            SUB    8N
0324   010B   0000            DAR
0325   010C   9A15            STA    ADRS1       BYTE POINTER TO ACCOUNT NO JUST INPUT
0326   010D   8213            LDA    PWORD1
0327   010E   1351            LLA    2
0328   010F   9A13            STA    ADRS2       NIBBLE POINTER TO WORD1,2,AND 3
0329   0110   C701            LAM    1
0330   0111   9A12            STA    WORD1
0331   0112   9A12            STA    WORD2
0332   0113   9A12            STA    WORD3
0333   0114   F9C0   LOOP1    JST    LDWRD2      PICK UP NEXT ASCII CHARACTER OF
0334   0115   0122            DATA   ADRS1       ACCOUNT NO.
0335   0116   C08A            CAI    '.'         .?
0336   0117   F603            JMP    LOOP1       YES,SKIP
0337   0118   C0A0            CAI    ' '                    SPACE?
0338   0119   F605            JMP    LOOP1       YES,SKIP
0339   011A   C08C            CAI    $80         END OF MESSAGE?
0340   011B   F203            JMP    ELOOP1      YES
0341   011C   F3CC            JST    STWCD4      STORE BCD PART OF ACCOUNT NO.
0342   011D   0123            DATA   ADRS2
0343   011E   F60A            JMP    LOOP1       GET NEXT CHARACTER OF ACCOUNT NO.
0344   011F   FA0J   ELOOP1   JST    SEARCH      SEARCH BAD ACCOUNT FILE FOR ENTRY
0345   0120   F723            RTN    SRCH1
0346                          *
0347                          *
0348   0121   0124   PWORD1   DATA   WORD1
0349   0122   0000   ADRS1    DATA   0
0350   0123   0000   ADRS2    DATA   0
0351   0124   00C0   WORD1    DATA   0           KEEP
0352   0125   00C0   WORD2    DATA   0           IN THIS
0353   0126   00C0   WORD3    DATA   0           ORDER
0354   0127   0000   CNT      DATA   0
0355   0128   0037   C55      DATA   55
0356   0129   0251   PBLKMS   DATA   BLKMES
0357                          *
0358                          * SEARCH THE BAD ACCOUNT FILE FOR A GIVEN ENTRY IN WORD1,
                                 WORD2, WORD3
0359                          *
0360   012A   0800   SEARCH   ENT
0361   012B   C600            LAP    0
0362   012C   9A05            STA    FADD        ZERO FIRST AVAILABLE FILE ADDRESS
0363   012D   9A05            STA    MADD        ZERO MATCH FILE ADDRESS
0364   012E   F205            LDX    PBADAC      LOAD X WITH ADDRESS OF BAD ACCOUNT FILE
0365   012F   84C0   LOOP2    LDA    $0          LOAD FIRST WORD OF NEXT BAD ACCOUNT
0366   0130   D6CC            CMS    WORD1       EQUAL FIRST WORD OF ENTRY?
0367   0131   F210            JMP    CKA         NO, SEE IF AVAILABLE SLOT
0368   0132   F2CF            JMP    CKA         NO, SEE IF AVAILABLE SLOT
0369   0133   8401            LDA    $1          YES, LOAD SECOND WORD OF BAD ACCOUNT
0370   0134   D6CF            CMS    WORD2       EQUAL TO SECOND WORD OF ENTRY?
0371   0135   F2C6            JMP    ELOOP2      NO, TRY NEXT BAD ACCOUNT
0372   0136   F2C5            JMP    ELOOP2      NO, TRY NEXT BAD ACCOUNT
0373   0137   8402            LDA    $2          YES, LOAD THIRD WORD OF BAD ACCOUNT
0374   0138   0612            CMS    WORD3       EQUAL TO THIRD WORD OF ENTRY?
0375   0139   F2C2            JMP    ELOOP2      NO, TRY NEXT BAD ACCOUNT
0376   013A   F201            JMP    ELOOP2      NO, TRY NEXT BAD ACCOUNT
0377   013B   F2CE            JMP    MATCH       YES, MATCH
0378   013C   C2C3   ELOOP2   AXI    3           ADD 3 TO THE BAD ACCOUNT ADDRESS
0379   013D   0C30            TXA                TRANSFER BAD ACCOUNT TO A
0380   013E   D1CC            CMS    PEBACA      STILL IN BAD ACCOUNT FILE?
0381   013F   F010            JMP    LOOP2       YES
0382   0140   CCC0            NOP                NO
0383   0141   F717            RTN    SEARCH      NO
0384   0142   0150   CKA      IAR
0385   0143   2101            JAZ    $+2         FIRST WORD OF BAD ACCOUNT ENTRY =-1
0386   0144   F608            JMP    ELOOP2      NO
0387   0145   87BC            LDA    FADD        YES
0388   0146   2101            JAZ    $+2         ALREADY HAVE FIRST AVAILABLE FILE ADDRESS
0389   0147   F6CB            JMP    ELOOP2      YES
0390   0148   EAB9            STX    FADD        NO, STORE CURRENT FILE ADDRESS IN FADD
0391   0149   F600            JMP    ELOOP2
0392   014A   EAB8   MATCH    STX    MADD        STORE CURRENT FILE ADDRESS IN MADD
0393   014B   F721            RTN    SEARCH
```

```
0394        *
0395        * KEYBOARD SEARCH OF BAD ACCOUNT FILE
0396        *
0397  014C  C600  SRCH   LAP   0
0398  014D  F90C         JST   DPLY:      SEARCH
0399  014E  F65C         JMP   ERR1
0400  014F               DATA  MES16
0401  0150  FE53         JST   SRCH1      GET KEYBOARD ENTRY AND SEARCH B.A. FILE
0402  0151  E281         LDX   MADD
0403  0152  2802         JXZ   EOF        MATCH FOUND?
0404  0153  FAC0         JST   FILADD     YES,DISPLAY FILE ADDRESS
0405  0154  F204         JMP   NEXT       GET NEXT COMMAND
0406  0155  C622  EOF    LAP   $22
0407  0156  F9C0         JST   DPLY:      EOF
0408  0157  F665         JMP   ERR1
0409  0158               DATA  MES65
0410  0159  C601  NEXT   LAP   1
0411  015A  F90C         JST   KBIN:      GET NEXT COMMAND FROM R.M. KEYBOARD
0412  015B  8000         AND   =$F
      015B  000F
0413  015C  C0CA         CAI   $A         GO TO START OF BAD ACCOUNT MODE?
0414  015D  F698         JMP   THREE      YES
0415  015E  C0CC         CAI   $C         STAY IN CURRENT MODE?
0416  015F  F201         JMP   $+2        YES
0417  0160  F607         JMP   NEXT       INVALID COMMAND - TRY AGAIN
0418  0161  866E         LDA   TEMP       LOAD CURRENT MODE
0419  0162  F67F         JMP   WHAT
0420        *
0421        * KEYBOARD ADD TO THE BAD ACCOUNT FILE
0422        *
0423  0163  C60C  KBADD  LAP   0
0424  0164  F90C         JST   DPLY:      KB ADD
0425  0165  F673         JMP   ERR1
0426  0166               DATA  MES21
0427  0167  FE6A         JST   SRCH1      GET KB ENTRY AND SEARCH B.A. FILE
0428  0168  E25A  ADD1   LDX   MADD
0429  0169  3808         JXN   TAG1       MATCH FOUND?
0430  016A  E297         LDX   FADD       NO
0431  016B  2856         JXZ   EOF        FILE FULL?
0432  016C  8648         LDA   WORD1      YES, ADD WORD1,2, AND 3 TO FILE
0433  016D  9CC0         STA   $0
0434  016E  3649         LDA   WORD2
0435  016F  9CC1         STA   $1
0436  0170  964A         LDA   WORD3
0437  0171  9CC2         STA   $2
0438  0172  FAA1  TAG1   JST   FILADD     DISPLAY FILE ADDRESS
0439  0173  F61A         JMP   NEXT       GET NEXT COMMAND
0440        *
0441        *
0442  0174  E100  LIST   LDX   CURTRM
0443  0175  F9CC         JST   STRTS      LIST BAD ACCOUNTS
0444  0176  000F         DATA  8
0445  0177        DUMP   REF
0446  0178  F6E3         JMP   THREE
0447        *
0448        * KEYBOARD DELETE TO THE BAD ACCOUNT FILE
0449        *
0450  0179  C60C  KBDEL  LAP   0
0451  017A  F900         JST   DPLY:      KB DEL
0452  017B  F689         JMP   ERR1
0453  017C               DATA  MES22
0454  017D  FE8C         JST   SRCH1      GET KB ENTRY AND SEARCH B.A. FILE
0455  017E  E284         LDX   MADD
0456  017F  286A         JXZ   EOF        ANY SLOTS LEFT IN B.A. FILE
0457  0180  C7C1         LAM   1          YES, DELETE FROM FILE
0458  0181  9FC0         STA   $0
0459  0182  FA91         JST   FILADD     DISPLAY FILE ADDRESS
0460  0183  F62A         JMP   NEXT       GET NEXT COMMAND
0461        *
0462        * CARD ADD TO THE BAD ACCOUNT FILE
0463        *
0464  0184  C6CC  CRDADD LAP   0
0465  0185  F90C         JST   DPLY:      CD ADD
0466  0186  F694         JMP   ERR1
0467  0187               DATA  MES23
0468  0188  FAC8         JST   BLKMES     BLANK MACHES
0469  0189  C40E         LXP   14
0470  018A  F900         JST   STTMR      TIMMER FOR CARD PRESENT
0471  018B  0BB8         DATA  3000
```

```
0472  018C  01FF         DATA  CRDTC
0473  018D  C640         LAP   #40
0474  018E  F900         JST   CM#         WAIT FOR CARD PRESENT
0475  018F  C60E         LAP   14
0476  0190  F900         JST   CANC        CANCEL TIMER
0477  0191  E100         LDX   CURTRM
0478  0192  C601         LAP   1
0479  0193  F900         JST   STRTS       START CARD READ AND SUSPEND
0480  0194  0008         DATA  8
0481  0195               DATA  CRDRC
0482  0196  7101         JAZ   S+2         CARD READ ERROR?
0483  0197  F27C         JMP   RTNCRD      YES
0484  0198  8500         LDA   SRVCTBL
0485  0199  9A82         STA   PRVDB
0486  019A  1351         LLA   2
0487  019B  9E79         STA   ADRS1
0488  019C  C7CD         LAM   13
0489  019D  9E76         STA   CNT
0490  019E  C506  LOOP4  LXM   6
0491  019F  82AE         LDA   WRD
0492  01A0  9AAE         STA   PWRD
0493  01A1  F900  LOOP5  JST   LDPCD4
0494  01A2  0122         DATA  ADRS1
0495  01A3  98AB         STA   #PWRD
0496  01A4  DAAA         INS   PWRD
0497  01A5  0128         IXR
0498  01A6  3845         JXN   LOOP5
0499  01A7  FDA5         JST   #BITDC
0500  01A8  98A3         STA   #PRVDB
0501  01A9  DAA2         INS   PRVDB
0502  01AA  DF83         INS   CNT
0503  01AB  F600         JMP   LOOP4
0504  01AC  E100         LDX   CURTRM
0505  01AD  E500         LDX   SRVCTBL
0506  01AE  84C3         LDA   #3          GET FIELD LENGTH (DC)
0507  01AF  829A         AND   #1F
0508  01B0  C000         CAI   0           ZERO ACCOUNT LENGTH?
0509  01B1  F256         JMP   RTNCRD      YES
0510  01B2  D253         CMS   #18         ACCOUNT LENGTH < OR = TO 18?
0511  01B3  F2C1         JMP   S+2
0512  01B4  F253         JMP   RTNCRD
0513  01B5  FACD         JST   ACTPLD
0514  01B6  C6C1  TAG2   LAP   1
0515  01B7  F1C0         LDX   CURTRM
0516  01B8  F9C0         JST   STRTS       CAPTURE CARD
0517  01B9  C0C8         DATA  8
0518  01BA               DATA  RTCP
0519  01BB  3106         JAN   ERR2
0520  01BC  C624         LAP   #24
0521  01BD  F900         JST   DPLY#       DISPLAY ACCOUNT NUMBER FROM CARD
0522  01BE  F6CC         JMP   ERR1
0523  01BF  033F         DATA  #ACHES
0524  01C0  FE96         JST   SEARCH      SEARCH BAD ACCOUNT FILE FOR ENTRY
0525  01C1  F655         JMP   ADD1
0526  01C2  F380  ERR2   JMP   #PTHREE
0527                     .
0528                     .
0529  01C3  080C  ACTBLD ENT
0530  01C4  F900         JST   BCOPIN
0531  01C5  9A3F         STA   ACLNG
0532  01C6  C600         LAP   0           ZERO OFFSET AND IND
0533  01C7  9A83         STA   OFFSET
0534  01C8  9A80         STA   IND
0535  01C9  B2CF         LDA   PBACH4      NIBBLE POINTER INTO BACHES
0536  01CA  9A3C         STA   ADRS3
0537  01CB  8235         LDA   ACLNG
0538  01CC  D000         CMS   =12
      01CD  000C
0539  01CD  F2C1         JMP   S+2         DC < 12
0540  01CE  F2C7         JMP   LNGENT      DC > 12
0541  01CF  1329         LLX   2           DC = 12 - MAKE NIBBLE POINTER
0542  01D0  EEAE         STX   ADRS1
0543  01D1  C7C1         LAM   1           STORE -1'S IN WORD 1,2, AND 3
0544  01D2  9EAE         STA   WORD1
```

```
0545  0103  9FAE            STA    WORC2
0546  0104  9EAE            STA    WORD3
0547  0105  F2C9            JMP    CRDENT
0548  0106  0000    LNGENT  CMS    =14
            000F
0549  0107  F201            JMP    S+2         DC < 14
0550  0108  0A7C            INS    INC         DC > 14
0551  0109  9000            SUB    =12         DC =14
            0C0C
0552  010A  9A70            STA    OFFSET
0553  010B  0030            TRA
0554  010C  1351            LLA    2           MAKE NIBBLE POINTER
0555  010D  8A6D            ADD    OFFSET      ADD OFFSET TO NIBBLE POINTER
0556  010F  9EBC            STA    ADRS1
0557  010F  F269    CRDENT  LDX    IND
0558  01E0  8224            LDA    ACLNG
0559  01E1  031C            NAR
0560  01F2  28C1            JNZ    S+2         ACCOUNT NUMBER > 14 DIGITS?
0561  01F3  C70E            LAM    14          YES
0562  01E4  8A66            ADD    OFFSET
0563  01E5  9EEE            STA    CNT
0564  01F6  A6C5            LDA    PWCRD1      POINTER TO WORD1
0565  01E7  1351            LLA    2           MAKE NIBBLE POINTER
0566  01E8  9EC5            STA    ADRS2
0567  01F9  F900    LOOP6   JST    LDPCD4      LOAD NIBBLE FROM BUFFER
0568  01EA  C122            DATA   ADRS1
0569  01EB  F900            JST    STPCD4      STORE NIBBLE I  WORD1,2, OR 3
0570  01EC  0123            DATA   ADRS2
0571  01ED  2800            ADD    =120        MAKE ASCII
            0080
0572  01EE  F900            JST    STPCD2      STORE BYTE IN BACKES
0573  01EF  0207            DATA   ADRS3
0574  01F0  0EC9            INS    CNT
0575  01F1  F608            JMP    LOOP6       GET NEXT NIBBLE
0576  01F2  8256            LDA    IND
0577  01F3  3101            JAN    S+2         THIS ALL OF ACCOUNT NUMBER?
0578  01F4  F731            RTN    ACTBLD      YES
0579  01F5  C622            LAP    34          NO
0580  01F6  8E04            ADD    ADRS1       POSITION ADRS1 TO NEXT NIBBLE
0581  01F7  9ED5            STA    ADRS1
0582  01F8  C60E            LAP    14          SET
0583  01F9  9251            SUB    OFFSET      UP
0584  01FA  9000            SUB    =12         CNT
            000C
0585  01FB  9FD4            STA    CNT
0586  01FC  011C            ZAR
0587  01FD  9A4B            STA    IND         ZERO IND
0588  01FE  F615            JMP    LOOP6
0589                        *
0590                        *
0591  01FF  C6C0    CRDTO   LAP    0
0592  0200  F900            JST    CANIO       CANCEL CARD HANDLER
0593  0201  F34E            JMP    *PTHREE
0594                        *
0595                        *
0596  0202  0060    FADD    DATA   0
0597  0203  0000    NADD    DATA   0
0598  0204            PBADAC  DATA   BADAC
0599  0205  0000    ACLNG   DATA   0
0600  0206  0018    N18     DATA   =18
0601  0207  0000    ADRS3   DATA   0
0602                        *
0603                        *
0604  0208  C60C    RTNCRD  LAP    0
0605  0209  E100            LDX    CURTRN
0606  020A  F9C0            JST    STRTS       RETURN CARD
0607  020B  0008            DATA   8
0608  020C            DATA   RTCP
0609  020D  2101            JAZ    S+2         RETURN ERROR?
0610  020E  F685            JMP    NEXT        YES, GET NEXT COMMAND
0611  020F  C6C0            LAP    0           NO
0612  0210  F900            JST    DPLY*       CR ADD
0613  0211  F385            JMP    *PERR1
0614  0212            DATA   MES23
```

```
0615  0213  F6RA           JMP   NEXT      GET NEXT COMMAND
0616                 •
0617                 •
0618  0214  0R00  FILADD  ENT
0619  0215  003C           TXA
0620  0216  D612           CMS   PBACAC
0621  0217  F2C2           JMP   S+3       <
0622  0218  0000           NOP             >
0623  0219  9615           SUB   PBADAC    =
0624  021A  C048           TAX
0625  021B  0110           ZAR
0626  021C  9A29           STA   BCD0      ZERO 5TH DIGIT
0627  021D  1328           LLX   1         PACK DIVIDEND
0628  021E  6R0E           SIN   5         TURN OFF INTERRUPTS FOR 4 INST.
0629  021F  80C0           CMS   =3        LOAD R REG. WITH 3
             0003
0630  0220  0000           NOP
0631  0221  1940           DVS   1
0632  0222  194F           DVS   16        DIVIDE STEP
0633  0223  0030           TXA             TRANSFER QUOTIENT TO A REG.
0634  0224  C150           TAR
0635  0225  02CF           CMS   C10000    COMPARE FILE ADDRESS WITH 10000
0636  0226  F202           JMP   S+3       <
0637  0227  0000           NOP             >
0638  0228  0A1D           IMS   BCD0      =,SET 5TH DIGIT TO ONE
0639  0229  F900           JST  BINRCD     FILE ADDRESS TO BCD
0640  022A  9A1C           STA   BCD0+1
0641  022B  821C           LDA   PBCD0     MAKE NIBBLE
0642  022C  1351           LLA   2         POINTER TO
0643  022D  8500           ADD   =3        4TH NIBBLE IN BCD0
             0003
0644  022E  9A0B           STA   ADRS4
0645  022F  FA21           JST   BLKMES    BLANK BACHES
0646  0230  8268           LDA   PBACM4    POINTER TO 5TH BYTE IN BACHES
0647  0231  9A69           STA   ADRS5
0648  0232  0110           ZAR
0649  0233  9A15           STA   IND       ZERO IND
0650  0234  C7C5           LAM   5
0651  0235  9A66           STA   CNT2
0652  0236  F9C0  LOOP3   JST   LDPCD4    GET NEXT NIBBLE FROM BCD0 AND BCD1
0653  0237  029A           DATA  ADRS4
0654  0238  F21D           LDX   IND
0655  0239  38C1           JXN   S+2       FOUND NONZERO CHARACTER?
0656  023A  71C4           JAZ   ELOOP3    NO, IS THIS DIGIT ZERO?
0657  023B  0A00           IMS   IND       NO
0658  023C  98DC           ADD   =I8C      MAKE CHARACTER ACSII
             C080
0659  023D  F9CC           JST   STPCC2    STORE ASCII DIGIT IN MES66
0660  023E  029E           DATA  ADRS5
0661  023F  0A5C  ELOOP3  IMS   CNT2      ANY MORE DIGITS?
0662  0240  F6CA           JMP   LOOP3     YES
0663  0241  C622           LAP   :22       NO
0664  0242  F900           JST   DPLYS     DISPLAY FILE ADDRESS
0665  0243  F383           JMP   @PERR1
0666  0244  033F           DATA  MACHES
0667  0245  F731           RTN   FILADD
0668                 •
0669                 •
0670  0246  0000  BCD0    DATA  0         KEEP
0671  0247  00C0           DATA  0         TOGETHER
0672  0248  0246  PBCD0   DATA  BCD0
0673  0249  0C0C  IND     DATA  0
0674  024A  001F  X1F     DATA  :1F
0675  024B  00CC  OFFSET  DATA  0
0676  024C  0C0C  PRVDB   DATA  0
0677  024D         BITDC  REF
0678  024E         VRD    REF
0679  024F  00C0  PWRD    DATA  0
0680  0250  00C5  PTHREE  DATA  THREE
0681                 •
0682                 •
0683  0251  C8C0  BLKMES  ENT
0684  0252  F2C4           LDX   PBACMS    LOAD ADDRESS OF BACHES
0685  0253  C612           LAP   18        LOAD NO. OF WORDS IN BACHES
```

```
0686  0254  F8C3         JST   *PMOVIT
0687  0255  837F         DATA  *BJCNES    MOVE BLANKS
0688  0256  F705         RTN   BLKMES
0689                     *
0690                     *
0691  0257  077F  PBACMS DATA  BACMES
0692  0258  RCF7  PMOVIT DATA  *MCVIT
0693  0259  C25A  PVAD   DATA  VAD
0694  025A  0F0A  VAD    DATA  10
0695  025B  00C5         DATA  5
0696  025C  C022         DATA  *22
0697  025D               DATA  MES17
0698  025E  025F  PVAD1  DATA  VAD1
0699  025F  CC11  VAD1   DATA  17
07C0  0260  00CC         DATA  12
0701  0261  0024         DATA  *24
0702  0262               DATA  MES17
0703                     *
0704                     * SCAN THE BAD ACCOUNT FILE
0705                     *
0706  0263  C60C  SCAN   LAP   0
0707  0264  F9CC         JST   DPLY1      SCAN
0708  0265  F361         JMP   *PERR1
0709  0266               DATA  MES18
0710  0267  860E         LDA   PVAD       INUM BUFFER
0711  0268  F90C         JST   STRTS      GET FILE ADDRESS FROM KEYBOARD
0712  0269  0009         DATA  9          AND DISPLAY IT
0713  026A               DATA  INUM
0714  026B  F500         LDX   BCLTBL
0715  026C  8435         LDA   BNLO       LOAD BINARY FILE ADDRESS
0716  026D  00CC         CMS   =0         FILE ADDRESS GREATER THAN ZERO?
              00C0
0717  026E  F71E         JMP   *PTHREE    NO
0718  026F  F201         JMP   $+2        YES
0719  0270  F720         JMP   *PTHREE    NO
0720  0271  0100         CMS   BASIZ      FILE ADDRESS LESS THAN FILE SIZE?
0721  0272  F202         JMP   $+3        YES
0722  0273  0FCC         NOP              NO
0723  0274  F724         JMP   *PTHREE    NO
0724  0275  90CC         SUB   =1
              0001
0725  0276  9A2C         STA   ADSFIL     STORE BINARY FILE ADDRESS -1
0726  0277  1150         LLA   1          MULTIPLY
0727  0278  8A1F         ADD   ADSFIL     BY 3
0728  0279  9A1C         STA   FILEA      STORE FILE ADDRESS *3
0729  027A  C623  PAGE   LAP   *23
0730  027B  9A1C         STA   LINE       SET UP LINE NO
0731  027C  C6CC         LAP   0
0732  027D  FA5F         JST   SRCMEF     SEARCH FOR NEXT ENTRY
0733  027E  F249         JMP   EOF1       END OF BAD ACCOUNT FILE
0734  027F  C705         LAM   5
0735  0280  9A18         STA   CNT2       NO. OF LINES PER PAGE
0736  0281  FA1B  LOOP7  JST   BUILDL     BUILD OUTPUT LINE OF TWO FILE ENTRIES
0737  0282  8215         LDA   LINE
0738  0283  F9CC         JST   DPLY1      DISPLAY OUTPUT LINE
0739  0284  F342         JMP   *PERR1
0740  0285  033F         DATA  BACMES
0741  0286  0A1C         INS   ADSFIL     UPDATE BINARY
0742  0287  0ACF         INS   ADSFIL     FILE ADDRESS
0743  0288  82CC         LDA   FILEA      UPDATE BINARY
0744  0289  88CO         ADD   =6         FILE
              0006
0745  028A  9A08         STA   FILEA      ADDRESS *3
0746  028B  0ACC         INS   LINE       INCREMENT DISPLAY LINE
0747  028C  0ACF         INS   CNT2       ANY MORE LINES FOR THIS PAGE?
0748  028D  F6CC         JMP   LOOP7      YES
0749  028E  C601  TAG4   LAP   1
0750  028F  F900         JST   KBIN1      WAIT FOR COMMAND
0751  0290  80CC         AND   =1F
              0COF
0752  0291  CCCC         CAI   1C         DISPLAY NEXT PAGE?
0753  0292  F618         JMP   PAGE       YES
0754  0293  C0CA         CAI   1A         RETURN TO BAD ACCOUNT MODE
0755  0294  F744         JMP   *PTHREE
```

```
0756  0295  F607          JMP   TAG4     INVALID COMMAND
0757                  *
0758                  *
0759  0296  C000  FILEA   DATA  0
0760  0297  00C0  ADSFIL  DATA  0
0761  0298  0000  LINE    DATA  0
0762  0299  0682  PBACH4  BAC   BACHES+4
0763  029A  0000  ADRS4   DATA  0
0764  029B  00C0  ADRS5   DATA  0
0765  029C  00C0  CNT2    DATA  0
0766                  *
0767                  *
0768  029D  0FCC  BUILDL  ENT
0769  029E  8607          LDA   ADSFIL   LOAD BINARY FILE ADDRESS
0770  029F  D100          CMS   BASIZ    FILE ADDRESS LESS THAN FILE SIZE?
0771  02A0  F202          JMP   *+3      <
0772  02A1  0000          NOP            >
0773  02A2  F225          JMP   EOF1     =
0774  02A3  869F          LDA   PBADAC   POINTER TO BADAC FILE
0775  02A4  9F0E          ADD   FILEA    ADD FILE ADDRESS #3
0776  02A5  1351          LLA   2        MAKE MIDDLE POINTER
0777  02A6  9F0C          STA   ADRS4
0778  02A7  P21C          LDA   PBACH2   BYTE POINTER TO BACHES+2
0779  02A8  9F0D          STA   ADRS5
0780  02A9  FF58          JST   BLKMES   BLANK BACHES
0781  02AA  C601          LAP   1
0782  02AB  9E62          STA   IND      MAKE IND NONZERO
0783  02AC  C70C  LOOP9   LAM   12
0784  02AD  9A17          STA   CNT1     MAX. NO. OF DIGITS IN ENTRY
0785  02AE  F900  LOOP10  JST   LDMOD4   LOAD NEXT DIGIT
0786  02AF  029A          DATA  ADRS4
0787  02B0  C00F          CAI   =F       DIGIT = HEX F
0788  02B1  F205          JMP   ELOOP0   YES
0789  02B2  E9C0          ADD   =180     NO, MAKE ASCII DIGIT
      02B1  C0F0
0790  02B3  F90C          JST   STMOD2   STORE ASCII DIGIT IN BACHES
0791  02B4  029B          DATA  ADRS5
0792  02B5  0ACF          IMS   CNT1     ANY MORE DIGITS
0793  02B6  F6C8          JMP   LOOP1C   YES
0794  02B7  966E  ELOOP0  LDA   IND
0795  02B8  ?1C1          JAN   $+2      ANY MORE ENTRIES ON THIS LINE
0796  02B9  F71C          RTN   BUILDL   NO
0797  02BA  870A          LDA   PBAM17   YES, BYTE POINTER TO BACHES+17
0798  02BB  9F20          STA   ADPS5
0799  02BC  966F          LDA   PBADAC   POINTER TO BAD ACCOUNT FILE
0800  02BD  9E27          ADD   FILFA    CREATE MIDDLE
0801  02BE  E8C0          ADD   =3       POINTER
      02BE  00C3
0802  02BF  1351          LLA   2        TO NEXT
0803  02C0  9F26          STA   ADPS4    FILE ENTRY
0804  02C1  0110          ZAR
0805  02C2  9579          STA   IND      ZERO IND
0806  02C3  F617          JMP   LOOP9
0807                  *
0808                  *
0809  02C4  0680  PBACM2  BAC   BACHES+2
0810  02C5  00C0  CNT1    DATA  0
0811  02C6  06BF  PBAM17  BAC   BACHES+17
0812  02C7  0CF2  PERR1   DATA  ERR1
0813                  *
0814                  *
0815  02C8  FE77  EOF1    JST   BLKMES   BLANK BACHES
0816  02C9  8631          LDA   LINE
0817  02CA  9E05          STA   CNT1
0818  02CB  CC28  LOOPE   CAI   =28      BLANKED ALL LINES
0819  02CC  F2C6          JMP   ELCCPE   YES
0820  02CD  F9C0          JST   DPLY:    NO, BLANK NEXT LINE
0821  02CE  F7C7          JMP   *PERR1
0822  02CF  033F          DATA  BACHES
0823  02D0  DE08          IMS   CNT1     UPDATE LINE COUNT
0824  02D1  860C          LDA   CNT1
0825  02D2  F607          JMP   LOOPE
0826  02D3  9638  ELOOPE  LDA   LINE
0827  02D4  F9CC          JST   DPLY:    EOF
```

```
0828  0205  F7CF         JMP   *PFRR1
0829  0206               DATA  MES65
0830  0207  C6C1  TAG5   LAP   1
0831  0208  F9CC         JST   KPTN1        WAIT FOR COMMAND
0832  0209  8CC0         AND   =1F
            000F
0833  020A  C00A         CAI   1A           GO TO BAD ACCOUNT MODE?
0834  020B  F788         JMP   *PTHREE
0835  020C  F6C5         JMP   TAG5         NO, INVALID COMMAND
0836                *
0837                * SEARCH FOR END OF FILE IN THE BAD ACCOUNT FILE
0838                *
0839  020D  CP00  SRCHEF ENT
0840  020E  9A1E         STA   TYPE
0841  020F  8A69         LDA   FILFA
0842  02F0  AFCC  LOOPB  ADD   PBADAC
0843  02F1  D1CC         CMS   PERADA
0844  02F2  F2C2         JMP   $+3
0845  02F3  0CC0         NOP
0846  02E4  F2CE         JMP   TAG7
0847  02F5  C04B         TAX
0848  02F6  B4C0         LDA   3D
0849  02F7  C150         IAA
0850  02F8  21C2         JAZ   ELOOPB
0851  02F9  DFDC         IMS   SRCHEF
0852  02EA  F205         JMP   TAG7
0853  02EB  8655  ELOOPB LDA   FILFA
0854  02EC  89CC         ADD   =3
            0003
0855  02ED  9E57         STA   FILFA
0856  02EE  CF57         IMS   ADSFIL
0857  02FF  F6DF         JMP   LOOPB
0858  02F0  820C  TAG7   LDA   TYPE
0859  02F1  3102         JAN   $+3
0860  02F2  F65C         LDA   FILFA
0861  02F3  FE0F         JST   FILADD       DISPLAY FILE ADDRESS
0862  02F4  F717         RTN   SRCHEF
0863                *
0864                *
0865  02F5  2710  C10000 DATA  10C0C
0866                *
0867                *
0868  02F6  F1CC  FOUR   LDX   CURTRM
0869  02F7  F9CC         JST   STRTS        SCHEDULE ACCOUNT MODE
0870  02F8  0CCF         DATA  8
0871  02F9        ACCT   REF
0872  02FA  F3C0         JMP   *PSUPRC
0873                *
0874                *
0875  02FB  C0C7  PSUPRC DATA  SUPERC
0876  02FC  0251  BLKMSP DATA  BLKPES
0877  02FD  CCCC  TYPE   DATA  0
0878                *
0879                *
0880  02FF  C0C0  SETTRM ENT
0881  02FF  010B  SUPER1 TXR
0882  0300  FA2C         STA   FLG
0883  0301  35CC  SUPER2 LDA  @TOTR
0884  0302  21C1         JAZ   $+2          TERMINAL UP?
0885  0303  F2C9         JMP   STEST        NO
0886  0304  9500         LDA   @INSFLG      YES
0887  0305  CCC7         CAI   7            ALREADY SUSPENDED?
0888  0306  F206         JMP   STEST        YES
0889  0307  CC01         CAI   1            NO, TRANSACTION GOING ON?
0890  0308  F210         JMP   SETFLG       YES
0891  0309  C6C7         LAP   7            NO
0892  030A  9000         STA   @INSFLG      MARK SUSPENDED
0893  030B  F900         JST   STRT         START TASK TO CANCEL THE CARD HANDLER
0894  030C  C31C         DATA  PWJTT        AND DISPLAY 'PLEASE WAIT'
0895  030D  C2C1  STEST  AXI   1            ADD ONE TO THE TERMINAL NO.
0896  030E  3030         TXA
0897  030F  CCC4         CAI   4            ALL FOUR TERMINALS CHECKED?
0898  0310  F201         JMP   $+2          YES
0899  0311  F61C         JMP   SUPER2       NO
```

```
0900  0312  8214         LDA   FLG
0901  0313  C0CC         CAI   0            ALL TERMINALS SUSPENDED?
0902  0314  F716         RTN   SETTPU
0903  0315  F0CC         LDX   13           NC
0904  0316  F9C0         JST   DELAY        DELAY 1/2 SECOND
0905  0317  0032         DATA  50
0906  0318  F519         JMP   SUPER1       TRY AGAIN
0907  0319  C601  SETFLG LAP   1
0908  031A  9ACC         STA   FLG          SET ALL TERMINALS NOT SUSPENDED FLAG
0909  031B  F40E         JMP   STEST
0910  031C  C0CC  PWAIT  LAP   0
0911  031D  F9C0         JST   CANIOC       CANCEL CARD HANDLER
0912  031E  C4CC         LAP   0
0913  031F  F9CC         JST   P
0914  0320  C6C3         LAP   3
0915  0321  F9CC         JST   OPLY1
0916  0322  F75P         JMP   *PFRR1
0917  0323               DATA  MES57        PLEASE WAIT
0918  0324  C4CC         LAP   0
0919  0325  F9CC         JST   V
0920  0326  F9CC         JST   QUIT
0921  0327  CCCC  FLG    DATA  0
0922                     *
0923                     *
0924  0328  C60C  DELALL LAP   0
0925  0329  F9CC         JST   OPLY1        DELETE ALL
0926  032A  F763         JMP   *PERR1
0927  032B               DATA  MES91
0928  032C  C6C1         LAP   1
0929  032D  F9CC         JST   KBIN1        WAIT FOR KEYBOARD CONFIRMATION
0930  032E  9000         AND   =1F
            000F
0931  032F  C00A         CAI   1A           ENTER?
0932  0330  F30C         JMP   *THREEP      YES, DO NOT DELETE ALL
0933  0331  C0CC         CAI   1C           CLEAR?
0934  0332  F2C1         JMP   $+2          YES, DELETE ALL
0935  0333  F60B         JMP   DELALL       INVALID COMMAND
0936  0334  F1CC         LDX   NBADSZ       -NUMBER OF WORDS IN THE BAD ACCOUNT FILE
0937  0335  EE7C         STX   CNT1
0938  0336  F2C7         LDX   BADACP       POINTER TO BAD ACCOUNTS
0939  0337  C7C1         LAM   1
0940  0338  9CC0  LOOPD  STA   6O           STORE -1 IN BAD ACCOUNT LOCATION
0941  0339  012P         IXR
0942  033A  DF7S         INS   CNT1         ANYMORE BAD ACCOUNT LOCATIONS?
0943  033B  F6C2         JMP   LOOPD        YES
0944  033C  F30C         JMP   *THREEP
0945                     *
0946                     *
0947  033D  00C5  THREEP DATA  THREE
0948  033E        BADACP DATA  BADAC
0949                     *
0950                     *
0951  033F  A0AC  BACMES RES   18,&BADAD
0952  0351  908C         DATA  &8080
0953                     END
0000  ERRORS
```

```
   ACCT     02F9         ACLNG    0205    X ACTBLD  01C3         ADD1     0168
   ADRS1    0122         ADRS2    0123      ADRS3   0207         ADRS4    029A
   ADRS5    029P       X AOSFIL   0297    X BACMES  033F         BADACP   033E
 X BADAC    C000       X BASIZ    0000    X BCDBIN  0000         BCDO     0246
 X BGV               X BINPCD    0000      BITDC   024D       X BLKMES   0251
   BLKMSP   02FC         BUILDL   029C    X CAND    0000       X CANIOC   0000
 X CANIO    00C0       X CM1      000C      CWA     0142       X CLTBL    0000
   CNT      0127         CNT1     02C5      CNT2    029C         COUNT    00F6
   CPR      002D         CRDADO   0184      CRDENT  010F       X CRDRO    0000
   CROTO    01FF       X CURTRM   00C0      C10000  02F5         C55      0128
   CRUF     0037         DELALL   032E    X DELAY   0C00         DIGIT    0082
 X OPLY1    C0C0         OTIME    0082      DUMP    C177         ELOOPB   02EB
   ELOOPE   C2D3         ELOOP0   0207      ELOOP1  011F         ELOOP2   013C
   ELOOP3   023F         END      0096      END1    009C       X ENSV     0000
   FCF      C155         EOF1     02CF      EPR1    00F2         ERR2     01C2
 X FADD     0202         FILADO   0214    X FILEA   0296         FLG      0327
   FOUR     02F6       X GETLOC   0000      H1B     0206         IND      0248
 X INSFLG   00C0       X INUM     000C      KBADD   0163         KBDEL    0179
 X KBIN1    0000         K        002F    X LDMOD2  0000       X LDMCD4   0000
```

| | | | | | | | |
|---|---|---|---|---|---|---|---|
| LINE | 0298 | LIST | 0174 | LNGENT | 0106 | LOOPB | 02E0 |
| LOOP0 | 0329 | LOOPE | 02CB | LOOP1 | 0114 | LOOP10 | 02AE |
| LOOP2 | 012F | LOOP3 | 0236 | LOOP4 | 019E | LOOP5 | 01A1 |
| LOOP6 | 01E9 | LOOP7 | 0281 | LOOP9 | 02AC | X MADD | 0203 |
| MATCH | 014A | X MBADSZ | 0000 | X MES | 0000 | X MES1 | 0000 |
| X MES10 | 0000 | X MES11 | 0000 | X MES13 | 0000 | X MES14 | 0000 |
| X MES15 | 0000 | X MES16 | 0000 | X MES17 | 0000 | X MES18 | 0000 |
| X MES2 | 0000 | X MES21 | 0000 | X MES22 | 0000 | X MES23 | 0000 |
| X MES24 | 0000 | X MES3 | 0000 | X MES4 | 0000 | X MES5 | 0000 |
| X MES57 | 0000 | X MES6 | 0000 | X MES64 | 0000 | X MES65 | 0000 |
| X MES66 | 0000 | X MES7 | 0000 | X MES8 | 0000 | X MES9 | 0000 |
| X MES90 | 0000 | X MES91 | 0000 | MOVIT | 00F7 | NEXT | 0159 |
| NLO | 0035 | N | 0030 | OCLR | 0064 | ODATA | 0076 |
| CENTER | 0081 | OFFSET | 024F | ONE | 0060 | PAGE | 027A |
| X PAUSE | 0000 | PBACMS | 0257 | X PBACM2 | 02C4 | X PBACM4 | 0299 |
| X PBADAC | 0204 | PBAM17 | 02C6 | PBCD0 | 0248 | PBLKMS | 0129 |
| PDATEM | 00F5 | PDFLAL | 00FC | X PEBADA | 0000 | PERR1 | 02C7 |
| PFOUR | 00F6 | PMOVIT | 025F | PRMOB | 024C | PSCAN | 00FB |
| PSFTTP | 00F4 | PSUPRC | 02FB | PTHREE | 0250 | PVAD | 0259 |
| PVAD1 | 025E | PWAIT | 031C | PWORD1 | 0121 | PWRD | 024F |
| X P | 0000 | P1EAMS | 00FA | X QUIT | 0000 | X RTCP | 0000 |
| PTNCPD | 0208 | X RMDT4L | 00CC | SCAN | 0263 | SCH | 00A1 |
| X SEARCH | 012A | SETFLG | 0315 | X SFTTPW | 02FE | X SHMCDE | 0080 |
| SHMCD | 00B1 | X SRCHEF | 02DC | SRCH | 014C | SRCH1 | 00F0 |
| STFST | 0300 | STIME | 00F8 | X STMGD2 | 0000 | X STMOD4 | 0000 |
| X STRTS | 0000 | X STRT | 0000 | X STIMR | 0000 | SUPERC | 0007 |
| SUPER2 | 0301 | X SUPER | 0000 | SUPER1 | 02FF | TAG | 008C |
| TAG1 | 0172 | TAG2 | 01B6 | TAG4 | 028E | TAG5 | 0207 |
| TAG7 | 02FC | TCLR | 003F | TDATA | C049 | TEMP | 00F3 |
| TENTEP | 0054 | THRFEP | 033C | THREE | 00C5 | TIMEM | 00F9 |
| X TCTR | 0000 | TWO | 0034 | TYPE | 02FD | VAD | 025A |
| VAD1 | 025F | X V | 0000 | WHAT | 00E3 | WHAT1 | 002B |
| X WCRD1 | 0124 | X WORD2 | 0125 | X WORD3 | 0126 | WRD | 024E |
| X1F | 024A | | | | | | |

TABLE II

```
0001            * DUMP - PROGRAM TO LIST THE BAD ACCOUNTS
0002            *
0003                    NAM  DUMP,STPRT
                        EXTP PRNT1,STRTS,DPLY1,CURTRM,BACMES,CANICC,MES12,MES20
0004                                                                       ,KBIN,
0005                    EXTP ERR2,STRT,QUITS,LDMCD4,STMOD2
0006                    EXTP QUIT
0007                    EXTP CAND
0008                    EXTP P,V
0009    0000            REL
0010            *
0011            *
0012    0000  C6CC  DUMP  LAP  0
0013    0001  989C        STA  #ADSFIL  START AT BEGINNING OF
0014    0002  9F9C        STA  #FILEA   BAD ACCOUNT FILE
0015    0003  C403        LXP  3
0016    0004  F9CC        JST  P
0017    0005  C601        LAP  1
0018    0006  F90C        JST  PRNT1    TURN ON T.P.
0019    0007              DATA ERP2
0020    0008  00CC        NOP
0021    0009  C4C3        LXP  3
0022    000A  F90C        JST  V
0023    000B  C602        LAP  2
0024    000C  F9CC        JST  CAND     CANCEL PRINTER TIME OUT
0025    000D  F10C        LDX  CURTRM
0026    000E  F900        JST  STRTS    GET CPB
0027    000F  000A        DATA 10
0028    0010        GETPB REF
0029            *
0030            *
0031    0011  C70A  LOOP1 LAM  10
0032    0012  9A5C        STA  STPRT    STPRT NOT EQUAL ZERO
0033    0013  9A9C        STA  CNTML    NUMBER OF RECEITS BEFORE PAUSE
0034    0014  F10C        LDX  CURTRM
0035    0015  F9CD        JST  STRT     WATCH FOR A ZERO FROM R.M.K.
0036    0016  00B5        DATA WRKP
0037            *
```

```
0038                   *
0039  0017  F6CC  LOOP2  LAP    0
0040  0018  F9CC         JST    DPLY*    LIST
0041  0019  F292         JMP    ERR1
0042  001A               DATA   MES20
0043  001B  C623         LAP    #23
0044  001C  9A91         STA    LINE
0045  001D  F6C3         LAP    3
0046  001E  C4CC         LXP    0
0047  001F  F88C         JST    *SFTUP   SETUP BUFFER,RTYPE, AND ADRS
0048  0020  C704         LAM    4
0049  0021  9A88         STA    CNT      NUMBER OF B.A. ON A RECEIPT
0050                   *
0051                   *
0052  0022  FA41  LOOP3  JST    BLDENT   BUILD DISPLAY LINE
0053  0023  A28A         LDA    LINE
0054  0024  F9CC         JST    DPLY*    DISPLAY B.A. LINE
0055  0025  F286         JMP    ERR1
0056  0026               DATA   BACRES
0057  0027  A379         LDA    *PBACM2
0058  0028  987A         STA    *SADRS1  POINTER TO ENTRY IN DISPLAY MESSAGE
0059  0029  E283         LDX    CNT
0060  002A  B5DC         LDA    *PCSTBL
      002B  C08F
0061  002B  B876         ADD    *SADRS
0062  002C  9877         STA    *SADRS2  POINTER INTO CPB
0063  002D  C506         LXM    6
0064  002E  C601         LAP    1
0065  002F  FB75         JST    *SMOVE   MOVE 6 CHARACTER FROM BACMES TO CPB
0066  0030  DB72         INS    *SADRS1  INCREMENT PAST
0067  0031  DB71         INS    *SADRS1  TWO BLANKS
0068  0032  C50C         LXM    12
0069  0033  C601         LAP    1
0070  0034  FB70         JST    *SMOVE   MOVE 12 DIGIT BAD ACCOUNT TO CPB
0071  0035  DB6E         INS    *ADSFIL
0072  0036  A368         LDA    *FILEA
0073  0037  8800         ADD    =3
0074  0038  9B6E         STA    *FILEA
0075  0039  DA74         INS    LINE     INCREMENT DISPLAY LINE NO.
0076  003A  DA72         INS    CNT      ANY MORE BAD ACCOUNTS ON THIS RECEIPT?
0077  003B  F619         JMP    LOOP3    YES
0078  003C  FA51         JST    PRINT    PRINT RECEIPT
0079  003D  A271         LDA    STPRT
0080  003E  31C1         JAM    $+2      PAUSE?
0081  003F  F20C         JMP    TAG      YES
0082                   *
0083                   *
0084  0040  DA6F  CONT   INS    CNTRL    MAX. NO OF RECEIPTS
0085  0041  F62A         JMP    LOOP2    NO
0086  0042  C603         LAP    3
0087  0043  F900         JST    CANIBC   CANCEL R.N.K.
0088  0044  C6C4         LAP    4
0089  0045  F900         JST    DPLY*    REMOVE RECEIPT
0090  0046  F205         JMP    ERR1
0091  0047               DATA   MES12
0092  0048  C6C1  TAG    LAP    1
0093  0049  F90C         JST    KBIN*    INPUT FROM R.N.K.
0094  004A  8000         AND    =1F
      004B  000F
0095  004B  C00C         CAI    #C       CLEAR?
0096  004C  F205         JMP    TAG1     YES
0097  004D  C0CA         CAI    #A       ENTER?
0098  004E  F209         JMP    END      YES
0099  004F  F607         JMP    TAG      INVALID COMMAND
0100                   *
0101                   *
0102  0050  B25F  TAG1   LDA    CNTRL
0103  0051  20B1         JAM    $+2      PAUSE OR RECEIPT PICKUP
0104  0052  F641         JMP    LOOP1    RECEIPT PICKUP
0105  0053  9A5B         STA    STPRT
0106  0054  E100         LDX    CUPTRN
0107  0055  F900         JST    STPT     LOCK FOR PAUSE
0108  0056  0085         DATA   WRKB
```

```
0109  0057  F617          JMP   CONT     CONTINUE DUMP
0110                   *
0111                   *
0112  0058  C403   END    LXP   3
0113  0059  F9CG          JST   P
0114  005A  C60C          LAP   0
0115  005B  F90C          JST   PRNT:    TURN OFF PRINTER
0116  005C                DATA  ERR2
0117  005D  0CCG          NOP
0118  005E  C403          LXP   3
0119  005F  F90U          JST   V
0120  0060  C602          LAP   2
0121  0061  F900          JST   CANC
0122  0062  C408          LXP   8
0123  0063  F9CC          JST   QUITS
0124                   *
0125                   *
0126  0064  0POC   BLDENT ENT
0127  0065  C601          LAP   1
0128  0066  FB3F          JST   *SRCHEF  SEARCH FOR NEXT ENTRY
0129  0067  F21E          JMP   EOF      END OF FILE
0130  0068  FB3E          JST   *BLKMES  BLANK BACHES
0131  0069  B337          LDA   *PBACH2  BYTE POINTE TO 2ND BYTE IN BACHES
0132  006A  0150          IAR
0133  006B  9B3C          STA   *ADRS5
0134  006C  B331          LDA   *ADSFIL  CURRENT LOCATION NUMBER
0135  006D  0150          IAR
0136  006F  FB34          JST   *STORE   STORE CURRENT LOCATION NUMBER IN BACHES
0137  006F  B331          LDA   *PBACH2
0138  0070  9B37          STA   *ADRS5
0139  0071  B342          LDA   *BCDO
0140  0072  FB37          JST   *STORE1  STORE MSB OF CLN IN BACHES
0141  0073  B320          LDA   *PBACH2
0142  0074  9B00          ADD   =8
            0068
0143  0075  9A30          STA   ADRS2    BYTE POINTER TO B.A. NO. IN BACHES
0144  0076  B334          LDA   *PBADAC   POINTER TO START OF B.A. FILE
0145  0077  9A27          ADD   *FILEA   INDEX INTO B.A. FILE
0146  0078  1351          LLA   2        MAKE BYTE POINTER
0147  0079  9A38          STA   ADRS1
0148  007A  C70C          LAM   12
0149  007B  9A35          STA   CNT1     MAX LENGTH OF B.A.
0150  007C  F9C0   LOOP4  JST   LDBCD4   LOAD BCD DIGIT FROM B.A. FILE
0151  007D  00B2          DATA  ADRS1
0152  007E  C0CF          CAI   =F       END OF B.A.?
0153  007F  F71B          RTN   BLDENT   YES
0154  0080  8BC0          ADD   =:PC     MAKE ASCII
            0CB0
0155  0081  F9C0          JST   STPOD2   STORE IN BACHES
0156  0082  00B3          DATA  ADRS2
0157  0083  9A2D          IMS   CNT1     ANY MORE DIGITS
0158  0084  F608          JMP   LOOP4    YES
0159  0085  F721          RTN   BLDENT
0160                   *
0161                   *
0162  0086  C603   EOF    LAP   3
0163  0087  F90C          JST   CANIOC   CANCEL R.H.K.
0164  0088  B224          LDA   CNT
0165  0089  88C0          ADD   =4
            0C04
0166  008A  1101          JAN   $+2      ANYTHING IN CPB
0167  008B  F633          JMP   END      NO
0168  008C  F401          JST   PRINT
0169  008D  F635          JMP   END
0170                   *
0171                   *  SUPER ALLOES ONLY ONE TERMINAL AT A TIME
0172                   *
0173  008E  0BC0   PRINT  ENT
0174  008F  C603          LXP   3
0175  0090  F900          JST   P
0176  0091  C603          LAP   3
0177  0092  F900          JST   PRNT:    PRINT CPB
0178  0093                DATA  ERR2
0179  0094  FFFF          DATA  -1
```

```
0180  0095  C6C9          LAP   9
0181  0096  F900          JST   PRNT;   CUT RECEIPT
0182  0097                DATA  ERR2
0183  0098  0000          NOP
0184  0099  C403          LAP   3
0185  009A  F9C0          JST   V
0186  009B  C602          LAP   2
0187  009C  F9C0          JST   CANC    CANCEL PRINTER TIME OUT
0188  009D  F7CF          RTN   PRINT
0189                  *
0190  009E          ADSFIL  REF
0191  009F          FILEA   REF
0192  00A0          SETUP   REF
0193  00A1          PBACM2  REF
0194  00A2          SADRS   REF
0195  00A3          SADRS1  REF
0196  00A4          SADRS2  REF
0197  00A5          SMOVE   REF
0198  00A6          SRCHEF  REF
0199  00A7          BLKMES  REF
0200  00A8          ADRSS   REF
0201  00A9          STORE   REF
0202  00AA          STORE1  REF
0203  00AB          PBADAC  REF
0204  00AC  05C0    ERR1    MLT
0205  00AD  0000    CNT     DATA  0
0206  00AE  0000    LINE    DATA  0
0207  00AF  0C0C    STPRT   DATA  0
0208  00B0  000C    CNTML   DATA  0
0209  00B1  C000    CNT1    DATA  0
0210  00B2  C000    ADRS1   DATA  0
0211  00B3  0000    ADRS2   DATA  0
0212  00B4          BCD0    REF
0213  00B5  C6C1    WRKB    LAP   1
0214  00B6  F900            JST   KBIN;
0215  00B7  8000            AND   =:F
            000F
0216  00B8  3143            JAM   WRKB    ZERO INPUT?
0217  00B9  9E0A            STA   STPRT   YES
0218  00BA  F900            JST   QUIT
0219  00BB  0000            DATA  0
0220  00BC  0001            DATA  1
0221  00BD  0028            DATA  40
0222  00BE  0029            DATA  41
0223  00BF  00C0   POSTBL   DATA  0
0224                        END
0000  ERRORS

0001            *  T4 SYSTEM
0002            *  ACCOUNTING FEATURE
0003            *  B. GARVIN
0004            *  FEBRUARY 17, 1974.
0005            *  NOVEMBER 5, 1974.
0006            *
0007            *  CALLING SEQUENCE:
0008            *       LDX  CURTRM
0009            *       JST  STRTS
0010            *       DATA 8
0011            *       DATA ACCT
0012            *
0013                NAM  ACCT
0014                NAM  TAMTD1,TAMTD2
0015                NAM  STORE,STORE1,ADRSS
0016                EXTR GETPB,STRTS,QUITS,DPLY1,KBIN:,BLKMES,BINBCD,STMOD2,
                                                                         BACMES
0017                EXTR MES77,MES78,MES79,MES80,MES81,GETLOC,PRNT:
0018                EXTR MES82
0019                EXTR ERR2
0020                EXTR DELAY,CANC
0021                EXTR MES2,CURTRM,CLTBL
0022                EXTR LDMCD4,MES85,MES86,MES87,MES88,INUM,LDMOD2,STMOD4
0023                EXTR MES94
0024                EXTR BCDBIN
0025                EXTR P,V
```

```
0026        *
0027        *
0028        ****************************************************
0029        ********** CONDITIONAL ASSEMBLY PARAMETERS **********
0030        *
0031        *DISK= 1 FOR TRANSACTION LOGGING SYSTEMS
0032   0001  DISK   EQU  1
0033        ****************************************************
0034   002C  CPB    EQU  45
0035   002F  K      EQU  47
0036   0030  N      EQU  48
0037   0033  TTEMP  EQU  51
0038   0035  LO     EQU  53
0039   004C  SERNO  EQU  76
0040   004D  SERNO1 EQU  77
0041   005F  CAPFLG EQU  95
0042   0065  TDEN1  EQU  101
0043   0066  TDEN2  EQU  102
0044   0067  ENVEL  EQU  103
0045   0068  GOXACT EQU  104
0046   0069  ERXACT EQU  105
0047        *
0048        *
0049   0000 C6C0  ACCT   LAP   0
0050   0001 F900         JST   DPLY:    ACCOUNTING FEATURE
0051   0002 F2DE         JMP   ERR1
0052   0003              DATA  MES77
0053   0004 C621         LAP   :21
0054   0005 F900         JST   DPLY:    SELECT FUNCTION
0055   0006 F2DA         JMP   ERR1
0056   0007              DATA  MES2
0057   0008 C623         LAP   :23
0058   0009 F9C0         JST   DPLY:    1. BALANCE
0059   000A F2D6         JMP   ERR1
0060   000B              DATA  MES78
0061   000C C624         LAP   :24
0062   000D F90C         JST   DPLY:    2. SETTLEMENT
0063   000E F2D2         JMP   ERR1
0064   000F              DATA  MES79
0065   0010 C625         LAP   :25
0066   0011 F90C         JST   DPLY:    DEPOSITORY /SERIAL UPDATE
0067   0012 F2CE         JMP   ERR1
0068   0013              DATA  MES85
0069        0001         IFT   DISK     **************************
0070   0014 C626         LAP   :26
0071   0015 F900         JST   DPLY:    4. TRANSACTION FILE DUMP
0072   0016 F2CA         JMP   ERR1
0073   0017              DATA  MES94
0074                     ENDC  DISK     **************************
0075        *
0076        *
0077   0018 C601         LAP   1
0078   0019 F9C0         JST   KBIN:    WAIT FOR INPUT FROM THE R.H. KEYBOARD
0079   001A 900C         AND   =:F
             000F
0080   001B 9AD2         STA   TEMP1
0081   001C C0C1         CAI   1        BALANCE?
0082   001D F2CA         JMP   CONT     YES
0083   001E C002         CAI   2        SETTLEMENT?
0084   001F F2C8         JMP   CONT     YES
0085   0020 C003         CAI   3        DEPOSITORY/SERIAL UPDATE?
0086   0021 F203         JMP   DEPUPC   YES
0087        0001         IFT   DISK     **************************
0088   0022 C0C4         CAI   4        TRANSACTION FILE DUMP?
0089   0023 F303         JMP   =SDDRP   YES, GO SET DISK DUMP REQUEST FLAG
0090                     ENDC  DISK     **************************
0091   0024 C0DA         CAI   :A       GET OUT OF ACCOUNTING MODE?
0092   0025 F2B9         JMP   ENC      YES
0093   0026 F626         JMP   ACCT     INVALID COMMAND
0094        0001         IFT   DISK     **************************
0095   0027 016E SDDRP   DATA  SDDR
0096                     ENDC  DISK     **************************
0097        *
0098        *
0099   0028 C601  CONT   LAP   1
0100   0029 F900         JST   DPLY:    CURRENT TOTALS
```

```
0101  0024  F2B6              JMP   ERR1
0102  0028              DATA  MES80
0103  002C  C623              LAP   $23
0104  002D  F90C              JST   DPLY$           NO. DEN1 NO. DEN2 AMOUNT
0105  002E  F2E2              JMP   ERR1
0106  002F              DATA  MES81
0107  0030  C62E              LAP   $26
0108  0031  F9CC              JST   DPLY$           ENVELOPES CAPTURED GD XACT ER XACT
0109  0032  F2AE              JMP   ERR1
0110  0033              DATA  MES82
0111                    *
0112                    *
0113  0034  C110              ZAR
0114  0035  9AB6              STA   TAMTD1          ZERO HIGH ORDER PART OF AMOUNT
0115  0036  9A66              STA   TAMTD2
0116  0037  F9C0              JST   GETLOC
0117  0038  8465              LOA   BTDEN1          TOTAL NUMBER OF DEN1 BILLS DISPENSED
0118  0039  210C              JAZ   SLOOPD
0119  003A  C110              NAR
0120  003B  9A84              STA   CNT2
0121  003C  0110              ZAR
0122  003D  8AAB  LOOPC  ADD   #DEN1           ADD VALUE OF DEN1 TO AMOUNT
0123  003E  02B3              CMS   C9999           AMOUNT GREATER THAN 9999?
0124  003F  F2C4              JMP   ELOOPC          NO
0125  0040  F201              JMP   $+2             YES
0126  0041  F2C2              JMP   ELOOPC          NO
0127  0042  92BC              SUB   C10000          SUBTRACT 10000 FROM AMOUNT
0128  0043  0AA8              IMS   TAMTD1          INCREMENT 10 THOUSANDS PART OF AMOUNT
0129  0044  0AA8  ELOOPC  IMS   CNT2             ANY MORE DEN1'S?
0130  0045  F6C8              JMP   LOOPC           YES
0131  0046  F46C  SLOOPO  LOX   BTDEN2          NO, TOTAL NUMBER OF DEN2 BILLS DISPENSED
0132  0047  28CB              JXZ   TAGD
0133  0048  05CB              NXR
0134  0049  EAA6              STX   CNT2
0135  004A  889F  LOOPD  ADD   #DEN2           ADD VALUE OF DEN2 TO AMOUNT
0136  004B  02A6              CMS   C9999           AMOUNT GREATER THAN 9999
0137  004C  F204              JMP   ELOOPD          NO
0138  004D  F201              JMP   $+2             YES
0139  004E  F202              JMP   ELOOPD          NO
0140  004F  92A3              SUB   C10000          SUBTRACT 10000 FROM AMOUNT
0141  0050  0A98              IMS   TAMTD1          INCREMENT 10 THOUSANDS PART OF AMOUNT
0142  0051  0A9E  ELOOPD  IMS   CNT2             ANY MORE DEN2'S?
0143  0052  F608              JMP   LOOPD           YES
0144  0053  9A59  TAGD    STA   TAMTD2          NO, STORE PART OF AMOUNT LESS THAN 10000
0145                    *
0146                    *
0147  0054  FB9F              JST   #BLKMSP         BLANK BACMES
0148  0055  8495              LOA   #PBACM4
0149  0056  9A5A              STA   ADRSS           BYTE POINTER INTO BACMES
0150  0057  F9D0              JST   GETLCC
0151  0058  8465              LOA   BTDEN1          TOTAL NUMBER OF DEN1 BILLS DISPENSED
0152  0059  FA77              JST   STCRE           STORE IN DISPLAY BUFFER
0153  005A  C6C7              LAP   7
0154  005B  8A95              ADD   ADRSS
0155  005C  9A9A              STA   ADRSS
0156  005D  8466              LOA   BTDEN2          TOTAL NUMBER OF DEN2 BILLS DISPENSED
0157  005E  FA72              JST   STCRE           STORE IN DISPLAY BUFFER
0158  005F  C607              LAP   7
0159  0060  8A9C              ADD   ADRSS
0160  0061  9A8F              STA   ADRSS
0161  0062  C6A4              LAP   $A4
0162  0063  F9CC              JST   STPCD2          STORE # IN DISPLAY BUFFER
0163  0064  C0F1              DATA  ADRSS
0164  0065  8286              LOA   TAMTC1          LOAD 10 THOUSAND'S PART OF AMOUNT
0165  0066  F9C0              JST   BINBCD          BINARY ===> BCD
0166  0067  837F              LOA   #BCD3           HUNDRED THOUSANDS ===>
0167  0068  FA73              JST   STORE1          DISPLAY BUFFER
0168  0069  837E              LOA   #BCD4           TEN THOUSANDS===>
0169  006A  FA71              JST   STORE1          DISPLAY BUFFER
0170  006B  9281              LOA   TAMTD2          LOW ORDER PART OF AMOUNT
0171  006C  FA64              JST   STORE           STORE IN DISPLAY BUFFER
0172  006D  C624              LAP   $24
0173  006E  F9C0              JST   DPLY$           DISPLAY BACMES
0174  006F  F271              JMP   ERR1
0175  0070              DATA  BACMES
```

```
0176                    •
0177                    •
0178  0071  F882        JST  =BLKRSP  BLANK BACHES
0179  0072  8378        LDA  =PBACH4
0180  0073  9A70        STA  ADRS5    BYTE POINTER INTO BACHES
0181  0074  F900        JST  GETLOC
0182  0075  8467        LDA  =ENVEL   NUMBER OF ENVELOPES
0183  0076  FA5A        JST  STORE    STORE IN DISPLAY BUFFER
0184  0077  C606        LAP  6
0185  0078  9A7E        ADD  ADRS5
0186  0079  9A77        STA  ADRS5
0187  007A  =45F        LDA  =CAPFLG  NUMBER OF CARD CAPTURED
0188  007B  FA55        JST  STORE    STORE IN DISPLAY BUFFER
0189  007C  C604        LAP  4
0190  007D  9A73        ADD  ADRS5
0191  007E  9A72        STA  ADRS5
0192  007F  9468        LDA  =GODACT  NUMBER OF GOOD TRANSACTIONS
0193  0080  FA50        JST  STORE    STORE IN DISPLAY BUFFER
0194  0081  C6C4        LAP  4
0195  0082  8A6E        ADD  ADRS5
0196  0083  9A6D        STA  ADRS5
0197  0084  8469        LDA  =ERRACT  NUMBER OF ERROR TRANSACTIONS
0198  0085  FA4B        JST  STORE    STORE IN DISPLAY BUFFER
0199  0086  C627        LAP  #27
0200  0087  F9C0        JST  DPLY:    DISPLAY BACHES
0201  0088  F258        JMP  ERR1
0202  0089               DATA BACHES
0203                    •
0204                    •
0205  008A  C001  TAG6  LAP  1
0206  008B  F900        JST  KBIN:    GET COMMAND FROM R.H. KEYBOARD
0207  008C  9000        AND  =#F
      000F
0208  008D  C0CA        CAI  #A       ENTER BUTTON?
0209  008E  F68E        JMP  ACCT     YES
0210  008F  C0CC        CAI  #C       CLEAR BUTTON
0211  0090  F201        JMP  $+2      YES
0212  0091  F607        JMP  TAG6     INVALID COMMAND
0213  0092  8258        LDA  TEMP1
0214  0093  C002        CAI  2        SETTLEMENT MODE
0215  0094  F201        JMP  $+2      YES
0216  0095  F495        JMP  ACCT     NO
0217                    •
0218                    •
0219  0096  E100        LDX  CURTRN
0220  0097  F900        JST  STRTS    GET PRINT BUFFER
0221  0098  000A        DATA 10
0222  0099              DATA GETPR
0223  009A  C602        LAP  2
0224  009B  C4C0        LXP  0
0225  009C  FR47        JST  =SFTUP   SETUP T.P. RECEIPT FOR SETTLEMENT MODE
0226  009D  C403        LXP  3
0227  009E  F9CC        JST  P
0228  009F  C6C1        LAP  1
0229  00A0  F9CC        JST  PRNT:    TURN ON T.P.
0230  00A1              DATA ERR2
0231  00A2  000C        NOP
0232  00A3  C41C        LXP  28
0233  00A4  F9CC        JST  DELAY    DELAY FOR T.P.
0234  00A5  00CP        DATA 20C
0235  00A6  C603        LAP  3
0236  00A7  F9CC        JST  PRNT:    PRINT T.P. RECEIPT
0237  00A8              DATA ERR2
0238  00A9  FFFF        DATA -1
0239  00AA  C609        LAP  9
0240  00AB  F9C0        JST  PRNT:    CUT T.P. RECEIPT
0241  00AC              DATA ERR2
0242  00AD  CC0C        NOP
0243  00AE  C6C0        LAP  0
0244  00AF  F900        JST  PRNT:    TURN OFF T.P.
0245  00B0              DATA ERR2
0246  00B1  C000        NOP
0247  00B2  C403        LXP  3
0248  00B3  F900        JST  V
0249  00B4  C602        LAP  2        CANCEL PRINTER TIMMER
0250  00B5  F900        JST  CAND
```

```
0251            0001            IFT   DISK    ****************************
0252    0086    C410            LXP   16
0253    0087    F900            JST   P
0254    0088    F900            JST   GETLCC
0255    0089    8420            LDA   XCPB
0256    008A    9827            STA   XCJPB           MOVE CPB TO CURRENT JP BUFFER
0257    008B    C600            LAP   0               RELEASE CPB
0258    008C    9C20            STA   XCPB
0259                            ENDC  DISK    ****************************
0260    008D    C4C2            LAP   2
0261    008E    C401            LXP   1
0262    008F    FA24            JST   =SETUP          SETUP J.P. RECEIPT FOR SETTLEMENT
0263    00C0    FA22            JST   =MVP            MOVE CJPB TO J.P. PRINT LIST
0264    00C1    0800            HLT
0265            0001            IFT   DISK    ****************************
0266    00C2    C410            LXP   16
0267    00C3    F900            JST   V
0268                            ENDC  DISK    ****************************
0269                    *
0270                    *
0271    00C4    F900            JST   GETLCC
0272    00C5    0110            ZAR                   ZERO ALL SETTLEMENT DATA
0273    00C6    9C67            STA   aENVEL
0274    00C7    9C5F            STA   XCAPFLG
0275    00C8    9C68            STA   BGOTACT
0276    00C9    9C69            STA   aERIACT
0277    00CA    9C65            STA   aTDEN1
0278    00CB    9C66            STA   aTDEN2
0279    00CC    9A1F            STA   TAMTD1
0280    00CD    9A1F            STA   TAMTD2
0281    00CE    F6CF            JMP   ACCT
0282                    *
0283                    *
0284    00CF    C4C8    END     LXP   8
0285    00D0    F90C            JST   QUITS
0286                    *
0287                    *
0288    0001    08C0    STORE   ENT
0289    0002    F90C            JST   BINBCD          BINARY ===> BCD
0290    0003    8311            LDA   =BCD1           THOUSAND DIGIT
0291    0004    FA07            JST   STORE1
0292    0005    8310            LDA   =BCD2           HUNDRED DIGIT
0293    0006    FA05            JST   STORE1
0294    0007    830F            LDA   =BCD3           TEN DIGIT
0295    0008    FA03            JST   STORE1
0296    0009    830E            LDA   =BCD4           UNIT DIGIT
0297    000A    FA01            JST   STORE1
0298    000B    F70A            RTN   STORE
0299                    *
0300                    *
0301    000C    0800    STORE1  ENT
0302    000D    8=00            ADD   =1BC            BCD===> ASCII
                0000
0303    000F    F9C0            JST   STMOD2          MOVE TO BUFFER
0304    000F    CCF1            DATA  ADRSS
0305    00E0    F704            RTN   STORE1
0306                    *
0307                    *
0308    00E1    0800    ERR1    HLT
0309                    *
0310                    *
0311    00E2            CJPB    REF
0312    00E3            MVB     REF
0313    00E4            SETUP   REF
0314    00E5            BCD1    REF
0315    00E6            BCD2    REF
0316    00E7            BCD3    REF
0317    00E8            BCD4    REF
0318    00E9            DEN1    REF
0319    00EA            DEN2    REF
0320    00EB            PBACM4  REF
0321    00EC    0000    TAMTD1  DATA  0
0322    00ED    0000    TAMTD2  DATA  0
0323    00EE    0000    TEMP1   DATA  0
0324    00EF    0000    CNT1    DATA  0
0325    00F0    0000    CNT2    DATA  0
```

```
0326  0CF1  000C   ADRS5  DATA 0
0327  00F2  270F   C9999  DATA 9999
0328  00F3  2710   C10000 DATA 10000
0329  00F4         BLKMSP DATA BLKMES
0330                *
0331                *
0332  00F5  F900   DEPUPO JST  GETLOC
0333  00F6  C240          AXI  SERNO1
0334  00F7  1329          LLX  2
0335  00F8  C202          AXI  2
0336  00F9  EA58          STX  ADRS1   POINTER TO HIGH ORDER PART OF CSN
0337  00FA  A25F          LDA  PSMES
0338  00FB  9EC4          STA  ADRS5   POINTER TO DISPLAY BUFFER FOR CSN
0339  00FC  F900          JST  LOMOD4
0340  00FD  0155          DATA ADRS1
0341  00FE  FE22          JST  STORE1  STORE IN SMES
0342  00FF  F900          JST  LOMOD4
0343  0100  0155          DATA ADRS1
0344  0101  FE25          JST  STORE1  STORE IN SMES
0345  0102  F900          JST  GETLOC
0346  0103  844C          LDA  @SERNO   LOW ORDER PART OF CSN
0347  0104  FF33          JST  STORE    STORE IN SMES
0348  0105  C601          LAP  1
0349  0106  F900          JST  OPLY:    CURRENT SER. NO.
0350  0107  F626          JMP  ERR1
0351  0108          DATA MES86
0352  0109  C652          LAP  152
0353  010A  F900          JST  OPLY:    DISPLAY CSN
0354  010B  F62A          JMP  ERR1
0355  010C  0162          DATA SMES
0356                *
0357                *
0358  010D  P24E          LDA  PVAD1
0359  010E  E100          LDX  CURTBN
0360  010F  F900          JST  STRTS    GET 6 DIGIT DEPOS. SER. NO. FROM R.M.K
0361  0110  0CC9          DATA 9
0362  0111                DATA INUM
0363  0112  FA20          JST  GETVAL   GET FIXED AND VARIABLE PARTS
0364  0113  9A44          STA  D        DSN IN BINARY
0365                *
0366                *
0367  0114  824B          LDA  PVAD2
0368  0115  E1C0          LDX  CURTBN
0369  0116  F900          JST  STRTS    GET DESIRED SER.NO. FROM R.M.K
0370  0117  0CC9          DATA 9
0371  0118                DATA INUM
0372  0119  FA19          JST  GETVAL   GET FIXED AND VARIABLE PARTS
0373  011A  9A3C          STA  C        DESIRED SER. NO. IN BINARY
0374                *
0375                *
0376  011B  923C          SUB  D
0377  011C  2110          JAZ  SETSER   IF C-D=0,THEN SET SERIAL NO IN CPU
0378  011D  31P1          JAG  $+2      C-D=0?
0379  011E  8F28          ADD  C10000   NO.
0380  011F  0239          CMS  C100     NO. OF INCREMENTS NEEDED <,>,OR=TO 100?
0381  0120  F2C1          JMP  $+2      <
0382  0121  F339          JMP  @PACCT   >
0383  0122  031C          NAR           =
0384  0123  9F34          STA  CNT1
0385                *
0386                *
0387  0124  E1C0   LOOP1  LDX  CURTBN
0388  0125  F90C          JST  STRTS    INCREMENT PRINT WHEEL
0389  0126  000A          DATA 10
0390  0127          OPRNT REF
0391  0128  C431          LAP  49
0392  0129  F900          JST  DELAY    DELAY 6 SEC.
0393  012A  0064          DATA 100
0394  012B  DF3C          INS  CNT1     ANYMORE INCREMENTS
0395  012C  F6C8          JMP  LOOP1    YES
0396                *
0397                *
0398  012D  A230   SETSER LDA  MORDER
0399  012E  F900          JST  GETLOC
0400  012F  9C4D          STA  @SERNO1  NEW FIXED PART OR CSN
```

```
0401  0130  2226           LDA   C
0402  0131  9C4C           STA   aSERNC  NEW VARIABLE PART OF CSN
0403  0132  F663           JMP   END
0404                 *
0405                 *
0406                 *
0407  0133  0*CC   GETVAL  FNT
0408  0134  F900           JST   GETLOC
0409  0135  0C33           INS   aTTEMF  SIX DIGITS?
0410  0136  F324           JMP   *PACCT  NO
0411  0137  OC30           TXA
0412  0138  8427           ADD   CSS
0413  0139  1350           LLA   1
0414  013A  9C2F           ADD   aK
0415  013B  9430           SUB   aN
0416  013C  9A12           STA   ADRS1   POINTER TO DATA INPUT FROM R.M.K
0417                 *
0418                 *
0419  013D  F9C0           JST   LDMCD2  FIRST DIGIT
0420  013E  0155           DATA  ADRS1
0421  013F  8000           AND   =:F     ASCII===> BCD
      000F
0422  0140  1353           LLA   4
0423  0141  9A1C           STA   MORDER
0424  0142  F9C0           JST   LDMOD2  SECOND DIGIT
0425  0143  C155           DATA  ADRS1
0426  0144  90C0           AND   =:F     ASCII===> BCD
      000F
0427  0145  9A1F           ADD   MORDER
0428  0146  9A17           STA   MORDER  COMPLETE FIXED PART OF SERIAL NO.
0429                 *
0430  0147  B219           LDA   PLORD
0431  0148  1351           LLA   2
0432  0149  9ADC           STA   ADRS2   POINTER TO LORDER
0433  014A  C704           LAM   4
0434  014B  9E5B           STA   CNT2
0435  014C  F9C0   LOOP2   JST   LDMOD2  NEXT ASCII DIGIT OF VARIABLE PART OF S.N
0436  014D  0155           DATA  ADRS1
0437  014E  F900           JST   STMCD4  STORE DIGIT IN LORDER IN BCD
0438  014F  0156           DATA  ADRS2
0439  0150  DE60           INS   CNT2
0440  0151  F805           JMP   LOOP2
0441  0152  B20C           LDA   LORCER
0442  0153  F900           JST   BCDBIN  LORDER-BCD ===> BINARY
0443  0154  F721           RTN   GETVAL
0444                 *
0445                 *
0446  0155  000C   ADRS1   DATA  0
0447  0156  0000   ADRS2   DATA  0
0448  0157  0300   C       DATA  0
0449  015A  00C0   D       DATA  0
0450  0159  0064   C100    DATA  100
0451  015A  02C4   PSMES   PAC   SMES
0452  015B  00C0   PACCT   DATA  ACCT
0453  015C  016A   PVAD1   DATA  VAD1
0454  015D  016A   PVAD2   DATA  VAD2
0455  015E  C0CC   MORDER  DATA  C
0456  015F  C0C0   LORDER  DATA  0
0457  0160  0037   CSS     DATA  55
0458  0161  C15F   PLORD   DATA  LORCER
0459  0162  C00C   SMES    DATA  0
0460  0163  0C0C           DATA  0
0461  0164  00C0           DATA  0
0462  0165  3080           DATA  :BC8L
0463  0166  0018   VAD1    DATA  24
0464  0167  0006           DATA  6
0465  0168  C023           DATA  :23
0466  0169                 DATA  MES87
0467  016A  0018   VAD2    DATA  24
0468  016B  00C6           DATA  6
0469  016C  0025           DATA  :25
0470  016D                 DATA  MES88
0471        0001           IFT   DISK    ******************************
```

```
0473                        * SET TRANSACTION FILE DUMP REQUEST FLAG
0474   016F  F3C7   SDOR    LDA  #NCT      NUMBER OF TRANSACTIONS ON DISK.
0475   016F  9907           STA  *DDR      SFT/RESET DISK DUMP REQUEST
0476   0170  21C4           JAZ  SDOR2     JMP IF DISK IS EMPTY
0477   0171  C442           LIP  66
0478   0172  F90C           JST  DELAY     WAIT 2 SEC. THEN GO LOOK AGAIN
0479   0173  00C8           DATA 20C
0480   0174  F606           JMP  SDOR
0481   0175  F646   SDOR2   JMP  END       GO TO EXIT
0482   0176         NDT     REF
0483   0177         DDR     REF
0484                        ENDC DISR      *****************************
0485                        END
0000   ERRORS
```

| | | | | | | | |
|---|---|---|---|---|---|---|---|
| X ACCT | 0000 | ADRS1 | C155 | ADRS2 | 0156 | X ADRS5 | 00F1 |
| X BACKFS | C0CC | X BCD0IN | 000C | BCD1 | 00E5 | BCD2 | 00E6 |
| BC D3 | C0E7 | BC D4 | 00EF | X BIMBCD | 0000 | X BLKMES | 0000 |
| BLKMSP | 0CF4 | X CAND | 0000 | CAPFLG | 0C5F | CJPB | 00E2 |
| X CLTBL | 0CC0 | CNT1 | 00EF | CNT2 | 00F0 | CONT | 0028 |
| CPP | 0C2C | X CUPTRM | 00C0 | C | 0157 | C100 | 0159 |
| C10000 | 00F3 | CS5 | G1EC | C9999 | 00F2 | DDR | 0177 |
| X DELAY | 0900 | DEN1 | 00E9 | DFN2 | 00EA | DEPUPD | 00F5 |
| DISK | 0CC1 | X DPLY1 | 0000 | DPRNT | 0127 | D | 0158 |
| ELOOPC | 0044 | ELCOPD | 0051 | END | 00CF | ENVEL | 0067 |
| FPR1 | 0CE1 | X ERR2 | 0000 | FRXACT | 0069 | GDXACT | 0068 |
| X GETLOC | 00C0 | X GETPB | 0000 | GETVAL | 0133 | HOPDER | 015E |
| X INUM | C00C | X KBIN1 | 00C0 | K | 002F | X LDMOD2 | 0000 |
| X LDMCD4 | 000C | LOOPC | 0030 | LOOPD | 004A | LCOP1 | 0124 |
| LCOP2 | 014C | LORDER | 015F | LO | 0035 | X MES2 | 0000 |
| X MES77 | 0CCC | X MES78 | 0000 | X MES79 | 0000 | X MES80 | 0000 |
| X MFS81 | 00CC | X MESR2 | 0000 | X MES85 | 0000 | X MES86 | 0000 |
| X MFS87 | 0CCC | X MES88 | 00C0 | X MES94 | 0000 | MVB | 00E3 |
| NDT | 0176 | N | 0030 | PACCT | 0158 | PBACN4 | 00E8 |
| PLORD | 0161 | X PRNT1 | 0000 | PSNES | 015A | PVAD1 | 015C |
| PVAD2 | 015C | X P | 00CC | X OUITS | 0000 | SDORP | 0027 |
| SDOR | 016E | SDOR2 | 0175 | SERNO | 004C | SERNO1 | 0040 |
| SETSER | 012C | SETUP | 00F4 | SLOOPD | 0046 | SMFS | 0162 |
| X STMOD2 | 00C0 | X STMCD4 | 000C | X STORE | 0001 | X STORE1 | 00DC |
| X STRTS | C0CC | TAGO | 0053 | TAG6 | 008A | X TAMTD1 | 00EC |
| X TAMTD2 | 0FE0 | TOEN1 | 0065 | TOEN2 | 0066 | TEMP1 | 00EE |
| TTEMP | 0033 | VAD1 | 0166 | VAD2 | 016A | X V | 0000 |

While only one embodiment of the invention, together with modifications thereof, has been described in detail herein and shown in the accompanying drawings, it will be evident that various further modifications are possible without departing from the scope of the invention.

What is claimed is:

1. An automatic banking machine having a first mode of operation for completing banking functions including cash withdrawals and deposits, and a second mode of operation for initializing operational parameters of the machine for the first mode of operation, comprising in combination:

first means for switching from the first mode of operation to the second mode of operation, second means including a display and a memory of stored selected functions and associated instructions activated in the second mode of operation in response to said means for switching to call from memory and display selected functions of operation of the banking machine in the second mode to enable an operator to initialize operational parameters for controlling machine operation in the first mode, a keyboard operational in the first mode for customer selection of an available banking function and operational in the second mode for initializing operational parameters, said keyboard responsive to operator input during the second mode for selecting one of the displayed functions and activating said second means to present on the display instructions from memory to an operator for initializing the operational parameters of the selected function, said keyboard operational in response to an operator input for the selected function to enter data into the memory for initializing the operational parameters of the selected function to establish operation of the banking machine in the first mode of operation, and controller means for interconnecting said means for switching, said means including the display and memory, and said keyboard.

2. An automatic banking machine as set forth in claim 1, including means for printing out data in the automatic banking machine for selected functions in the second mode of operation.

3. An automatic banking machine as set forth in claim 1, wherein said keyboard includes an array of numbered push-button switches wherein the numbered push-button switches correspond to functions of operation displayed in the second mode of operation.

4. A banking system including a plurality of automatic banking machines, each machine operational in a first mode for completing banking functions including cash withdrawals and deposits, and a second mode of operation for initializing operational parameters for all of the banking machines in the first mode of operation, comprising in combination:

each of said automatic banking machines including means for switching all banking machines in the system from the first mode of operation to the second mode of operation, all of said automatic banking machines operational at the same time in either the first mode of operation or the second mode of operation, means, including a display for each of the automatic banking machines and a memory of stored selected functions and associated instructions, the display of one of said machines activated in the second mode of operation in response to said means for switching to call from memory and display selected functions of operation of the banking system in the second mode of operation to enable an operator to initialize operational parameters for controlling system operation in the first mode, a keyboard for each of said banking machines, each keyboard operational in the first mode for customer selection of an available banking function and operational in the second mode for initializing operational parameters, the keyboard of the banking machine displaying the selected functions being operational for selecting one of the displayed functions and activating said means including a display to present visual instructions from memory to an operator for initializing the operational parameters of the selected function for the banking system, said keyboard operational for the selected function to enter data instructions into the memory for initializing the parameters of the selected function to establish operation of the banking system in the first mode of operation, and controller means for interconnecting each of said banking machines and said means for switching, said means including the display and memory, and said keyboard.

5. A banking system as set forth in claim 4 including a journal printer for preparing hard copy of data in the banking system in selected functions of the second mode of operation.

6. A banking system as set forth in claim 4 wherein said controller responds to the operation of said means for switching at one of the banking machines to switch all other banking machines from the first mode of operation into a standby mode.

7. A method of initializing operational parameters of an automatic banking machine in a second mode of operation, the automatic banking machine including a display, a memory of stored selected functions and associated instructions, a keyboard operational in a first mode of the banking machine for customer selection of available banking functions and operational in the second mode of the banking machine for initializing operational parameters, and having the first mode of operation for completing banking functions such as cash withdrawals from an account and deposits to an account, comprising the steps of:

(a) storing in a memory selected operational functions of the banking machine in the second mode and instructions associated with each selected function, (b) recalling from memory by means of the dual function keyboard the selected operational functions for displaying to an operator to enable the operator to select one function to initialize operational parameters for the selected one function for controlling machine operation in the first mode, (c) recalling from memory by means of the dual function keyboard for the operator selected function instructions to be displayed to the operator for initializing the operational parameters of the selected function, and (d) storing in memory for the selected function data instructions for initializing the operational parameters of the selected function to establish operation of the banking machines in the first mode of operation.

8. The method of initializing an automatic banking machine as set forth in claim 7 including the step of repeating steps (b), (c), and (d) for each selected function in memory.

9. The method of initializing an automatic banking machine as set forth in claim 7 including the step of switching the banking machine from the first mode of operation to the second mode of operation.

* * * * *

UNITED STATES PATENT AND TRADEMARK OFFICE
CERTIFICATE OF CORRECTION

PATENT NO. : 4,355,369

DATED : October 19, 1982

INVENTOR(S) : Billy R. Garvin

It is certified that error appears in the above-identified patent and that said Letters Patent is hereby corrected as shown below:

On the title page, line 1, of the abstract, "banding" should read -- banking --.

Column 2, line 1, "diagrm" should read -- diagram --

Column 2, line 7, "illustrative" should read -- illustrations --

Column 2, line 7,, "displayy" should read -- display --

Column 6, line 68, "addressing" should read -- depressing --

Column 7, line 68, "illustrated" should read -- illuminated --

Column 11, line 1, "8B" should read -- 7B --.

Signed and Sealed this

Eighteenth Day of January 1983

[SEAL]

Attest:

Attesting Officer

GERALD J. MOSSINGHOFF

Commissioner of Patents and Trademarks